United States Patent
Tanioku et al.

(10) Patent No.: US 10,651,759 B2
(45) Date of Patent: May 12, 2020

(54) SWITCHING POWER SUPPLY DEVICE AND SEMICONDUCTOR DEVICE

(71) Applicant: Panasonic Intellectual Property Management Co., Ltd., Osaka (JP)

(72) Inventors: Masatoshi Tanioku, Osaka (JP); Takashi Saji, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/281,473

(22) Filed: Feb. 21, 2019

(65) Prior Publication Data

US 2019/0190398 A1 Jun. 20, 2019

Related U.S. Application Data

(63) Continuation of application No. PCT/JP2017/030030, filed on Aug. 23, 2017.

(30) Foreign Application Priority Data

Aug. 30, 2016 (JP) .................. 2016-168505

(51) Int. Cl.
*H02M 5/458* (2006.01)
*H02M 3/335* (2006.01)
(Continued)

(52) U.S. Cl.
CPC ............ *H02M 5/4585* (2013.01); *H02H 9/04* (2013.01); *H02M 1/32* (2013.01); *H02M 1/36* (2013.01);
(Continued)

(58) Field of Classification Search
CPC ........... H02H 9/04; H02M 1/08; H02M 1/32; H02M 1/36; H02M 3/33507;
(Continued)

(56) References Cited

U.S. PATENT DOCUMENTS 8,274,802 B2 * 9/2012 Saji .................. H02M 3/33523
363/21.16
2003/0057427 A1 3/2003 Chida
(Continued)

FOREIGN PATENT DOCUMENTS

JP H08-098530 A 4/1996
JP 2000-253654 A 9/2000
(Continued)

OTHER PUBLICATIONS

International Search Report issued in Application No. PCT/JP2017/030030 dated Sep. 26, 2017, with English translation.

*Primary Examiner* — Matthew V Nguyen
(74) *Attorney, Agent, or Firm* — McDermott Will & Emery LLP

(57) ABSTRACT

A switching power supply device includes: a rectifier circuit to which an AC input voltage is input; an input smoothing circuit smoothing a DC input voltage output from the rectifier circuit; a power converter circuit converting the DC input voltage and outputs an output voltage; an overvoltage detection circuit generating an input overvoltage detection signal which is activated when the DC input voltage is higher than a first reference voltage level; and a discharge circuit discharging stored charge stored in the input smoothing circuit. The power converter circuit includes a switching element. Switching of the switching element is stopped and discharging of the stored charge is started, with activation of the input overvoltage detection signal serving as a trigger, and when the input overvoltage detection signal is subsequently inactivated, the discharging is stopped and the switching of the switching element is resumed.

15 Claims, 19 Drawing Sheets

(51) Int. Cl.
*H02H 9/04* (2006.01)
*H02M 1/32* (2007.01)
*H02M 1/36* (2007.01)
*H02M 1/08* (2006.01)
*H02M 1/00* (2006.01)

(52) U.S. Cl.
CPC .......... *H02M 3/33523* (2013.01); *H02M 1/08* (2013.01); *H02M 2001/0006* (2013.01); *H02M 2001/322* (2013.01)

(58) Field of Classification Search
CPC ..... H02M 3/33523; H02M 2001/0006; H02M 2001/322; H02M 5/458; H02M 5/4585
See application file for complete search history.

(56) References Cited

U.S. PATENT DOCUMENTS

| | | | |
|---|---|---|---|
| 2004/0052092 A1 | 3/2004 | Hirosawa | |
| 2014/0036561 A1 | 2/2014 | Sakurai et al. | |
| 2014/0268951 A1* | 9/2014 | Wang | H02M 7/12 363/78 |
| 2015/0063392 A1 | 3/2015 | Takayama | |
| 2015/0381056 A1* | 12/2015 | Hayakawa | H03K 17/164 363/21.15 |
| 2016/0204715 A1* | 7/2016 | Fujimoto | H02M 3/156 363/89 |

FOREIGN PATENT DOCUMENTS

| | | |
|---|---|---|
| JP | 2004-023894 A | 1/2004 |
| JP | 2005-295622 A | 10/2005 |
| JP | 2012-060815 A | 3/2012 |
| JP | 5261857 B2 | 8/2013 |
| JP | 5661220 B2 | 1/2015 |
| WO | 2012/140840 A1 | 10/2012 |

\* cited by examiner

SWITCHING POWER SUPPLY DEVICE AND SEMICONDUCTOR DEVICE

CROSS REFERENCE TO RELATED APPLICATIONS

This application is a U.S. continuation application of PCT International Patent Application Number PCT/JP2017/030030 filed on Aug. 23, 2017, claiming the benefit of priority of Japanese Patent Application Number 2016-168505 filed on Aug. 30, 2016, the entire contents of which are hereby incorporated by reference.

BACKGROUND

1. Technical Field

The present disclosure relates to a switching power supply device including an input overvoltage protection function for protecting the switching power supply device and/or an electronic device from an excessive input voltage, and a semiconductor device included in the switching power supply device.

2. Description of the Related Art

In the field of power supply devices which convert an AC voltage from a commercial AC power supply into a DC voltage, switching power supply devices including semiconductor switching elements are widely used around the world in order to achieve high power conversion efficiency, downsizing, and so on.

Such switching power supply devices are often used as power supply devices for household electronic devices. Here is a problem, particularly in the case of their use in developing countries or the like, that a voltage sent to a household outlet possibly fluctuates to such an extent as to transiently exceed a nominal voltage range since infrastructure facilities for electric power are not sufficiently maintained. This has been causing another problem that electronic devices designed for the nominal voltage range continue to operate even in an input overvoltage state under application of this transient input overvoltage, which results in breakage of switching power supply devices.

There is disclosed a conventional technology to improve these problems, for example, in Japanese Unexamined Patent Application Publication No. 2005-295622 (hereinafter referred to as Patent Literature 1). A switching power supply device disclosed in Patent Literature 1 has an input overvoltage protection function, and stops switching operation when an input voltage reaches a set value.

Therefore, the switching power supply device disclosed in Patent Literature 1 can prevent breakage of a switching element by stopping the switching operation upon application of the input overvoltage.

SUMMARY

However, in a conventional switching power supply device as disclosed in Patent Literature 1, the switching operation is very late to be resumed after the applied input voltage is recovered to be normal.

FIG. 18 is a circuit diagram illustrating a configuration of a conventional switching power supply device which includes an input overvoltage protection function as disclosed in Patent Literature 1. FIG. 19 is a timing chart illustrating operation during input overvoltage in a conventional switching power supply device which includes an input overvoltage protection function as disclosed in Patent Literature 1.

When an input overvoltage is applied from AC power supply 1, input DC voltage VINDC of smoothing capacitor 3 rises. Then, when input DC voltage VINDC exceeds a preset input overvoltage detection voltage Vth_OV, the input overvoltage is detected, and switching operation is stopped. After the applied input voltage is subsequently recovered to be normal, it takes a very long time until voltage VINDC of smoothing capacitor 3 drops down to Vth_OV. The reason is that the charge stored in smoothing capacitor 3 is being discharged with a small current being consumed by the switching power supply device stopping the switching operation. Therefore, the input overvoltage detection is very late to be released, which results in very late resuming of the switching operation.

An object of the present disclosure is to provide a switching power supply device which solves the aforementioned problem and includes an input overvoltage protection function for making switching operation early to be resumed after an input voltage is recovered to be normal after the switching operation is stopped due to input overvoltage detection.

In order to solve the aforementioned problem, a switching power supply device according to one aspect of the present disclosure includes: a first rectifier circuit to which an AC input voltage is input; an input smoothing circuit that smoothes a DC input voltage output from the first rectifier circuit; a power converter circuit that converts the DC input voltage and outputs an output voltage; an input overvoltage detection circuit that generates an input overvoltage detection signal which is activated when the DC input voltage is higher than a first reference voltage level; and a discharge circuit that discharges stored charge stored in the input smoothing circuit. The power converter circuit includes an energy conversion circuit to which the DC input voltage is input, a switching element that is connected to the energy conversion circuit and performs switching of the DC input voltage, and a switching control circuit that controls switching of the switching element, the switching of the switching element is stopped and discharging of the stored charge is started, with activation of the input overvoltage detection signal serving as a trigger, and when the input overvoltage detection signal is subsequently inactivated, the discharge is stopped and the switching of the switching element is resumed.

With the switching power supply device according to one aspect of the present disclosure, the switching operation can be quickly resumed after the applied input voltage is recovered to be normal after the switching operation is stopped by input overvoltage protection.

Moreover, the switching power supply device may further include a second rectifier circuit between the first rectifier circuit and the input smoothing circuit; and an input overvoltage release detection circuit to which a pulsating voltage at a connection point between the first rectifier circuit and the second rectifier circuit is input and that generates an input overvoltage release determination signal which is activated when a peak value of the pulsating voltage is lower than a second reference voltage level. When the input overvoltage detection signal is activated and the input overvoltage release determination signal is activated, the discharge of the stored charge may be started.

With the switching power supply device according to one aspect of the present disclosure, discharge during a period when the input overvoltage is applied can be eliminated, and unnecessary current consumption and heat generation can be suppressed.

Moreover, the switching element, the switching control circuit, the input overvoltage detection circuit, and the discharge circuit may be configured as a semiconductor device, the discharge circuit may include the switching element, and the stored charge may be discharged via the switching element.

With the switching power supply device according to one aspect of the present disclosure, the switching element which is built in the semiconductor device and performs normal switching operation is used also for discharging the stored charge, and thereby, a high withstand voltage element dedicated for discharge can be eliminated.

Moreover, the switching element, the switching control circuit, the input overvoltage detection circuit, and the discharge circuit may be configured as a semiconductor device, the discharge circuit may include a field-effect transistor, and the stored charge may be discharged via the field-effect transistor operating in a saturated region.

With the switching power supply device according to one aspect of the present disclosure, the stored charge is discharged in the saturated region of the field-effect transistor, and thereby, a discharge current can be easily limited.

Moreover, the semiconductor device may include a drain terminal connected to the switching element, and the field-effect transistor may be connected to the drain terminal.

With the switching power supply device according to one aspect of the present disclosure, the stored charge is discharged via the high withstand voltage drain terminal of the semiconductor device which performs normal switching operation, and thereby, a high voltage terminal dedicated for discharge can be eliminated.

Moreover, the semiconductor device may include a drain terminal connected to the switching element, and the input overvoltage detection circuit may be connected to the drain terminal.

With the switching power supply device according to one aspect of the present disclosure, voltage detection and discharge of the stored charge are performed via the drain terminal, and thereby, the number of terminals can be reduced.

Moreover, the semiconductor device may include an input detection terminal that detects the DC input voltage, and the input overvoltage detection circuit may be connected to the input detection terminal.

With the switching power supply device according to one aspect of the present disclosure, the detection voltage can be easily adjusted with an external resistor by providing the input detection terminal, and an element with low withstand voltage can be used inside the semiconductor device by using the external resistor, which can reduce the area of the circuit.

Moreover, the switching control circuit, the input overvoltage detection circuit, and a part of the discharge circuit may be configured as a semiconductor device, the discharge circuit may include the switching element, and the stored charge may be discharged via the switching device.

With the switching power supply device according to one aspect of the present disclosure, the switching element which performs normal switching operation can also be used for discharging the stored charge in the switching power supply device in which the switching element is configured as another element in a separate package different from the package for the input overvoltage detection circuit, the switching control circuit, and so on, and a high withstand voltage element dedicated for discharge can be eliminated.

Moreover, the switching control circuit, the input overvoltage detection circuit, and the discharge circuit may be configured as a semiconductor device, the discharge circuit may include a field-effect transistor, and the stored charge may be discharged via the field-effect transistor operating in a saturated region.

With the switching power supply device according to one aspect of the present disclosure, the stored charge is discharged in the saturated region of the field-effect transistor, and thereby, a discharge current can be easily restricted.

Moreover, the semiconductor device may include a high voltage input terminal that supplies electric power to the switching control circuit, and the input overvoltage detection circuit may be connected to the high voltage input terminal.

With the switching power supply device according to one aspect of the present disclosure, the input voltage is also detected using the high voltage input terminal used for operation such as starting operation, and thereby, a high voltage terminal dedicated for input voltage detection can be eliminated.

Moreover, the semiconductor device may include an input detection terminal that detects the DC input voltage, and the input overvoltage detection circuit may be connected to the input detection terminal.

With the switching power supply device according to one aspect of the present disclosure, the detection voltage can be easily adjusted with an external resistor by providing the input detection terminal, and an element with low withstand voltage can be used inside the semiconductor device by using the external resistor, which can reduce the area of the circuit.

Moreover, the semiconductor device may include an auxiliary power supply terminal that supplies electric power to the switching control circuit, an auxiliary power supply capacitor may be connected to the auxiliary power supply terminal, and the discharge of the stored charge may be performed by moving charge to the auxiliary power supply capacitor.

With the switching power supply device according to one aspect of the present disclosure, the stored charge can be discharged by moving the stored charge of the input smoothing circuit to the auxiliary power supply capacitor, and an element such as an element dedicated for discharge can be eliminated.

Moreover, the semiconductor device may include a starter circuit that supplies the DC input voltage as electric power to the semiconductor device via the field-effect transistor at startup when input of the AC input voltage is started.

With the switching power supply device according to one aspect of the present disclosure, a common element is used for the field-effect transistor of the starter circuit and the field-effect transistor discharging the stored charge, and thus a field-effect transistor dedicated for discharge can be eliminated.

Moreover, a semiconductor device according to one aspect of the present disclosure may be a semiconductor device for switching control, the semiconductor device being included in the switching power supply device according to one aspect of the present disclosure, and the semiconductor device may include at least the switching control circuit and a part of the discharge circuit that are configured as an integrated circuit on a semiconductor substrate.

With the semiconductor device according to one aspect of the present disclosure, the number of components of a switching power supply device can be largely reduced, and downsizing, light weight, and low costs can be easily achieved.

As above, the present disclosure can achieves a switching power supply device including an input overvoltage protection function for making switching operation early to be resumed after an input voltage is recovered to be normal after the switching operation is stopped due to input overvoltage detection.

BRIEF DESCRIPTION OF THE DRAWINGS

These and other objects, advantages and features of the disclosure will become apparent from the following description thereof taken in conjunction with the accompanying drawings that illustrate a specific embodiment of the present disclosure.

DETAILED DESCRIPTION OF THE EMBODIMENTS

A switching power supply device and a semiconductor device of the present disclosure are hereafter described with reference to the drawings. It should be noted that detailed description may be omitted. For example, detailed description of the matters already well-known and duplicate description of substantially the same configurations may be omitted. This is to prevent the following description from being unnecessarily redundant and to ease understanding of the following description for those skilled in the art.

The accompanying drawings and the following description are for those skilled in the art to sufficiently understand the present disclosure, and are not intended to limit the subject matter disclosed by the appended claims.

Embodiment 1

A switching power supply device and a semiconductor device according to Embodiment 1 are hereafter specifically described with reference to FIG. 1 to FIG. 5.

Figure 1:
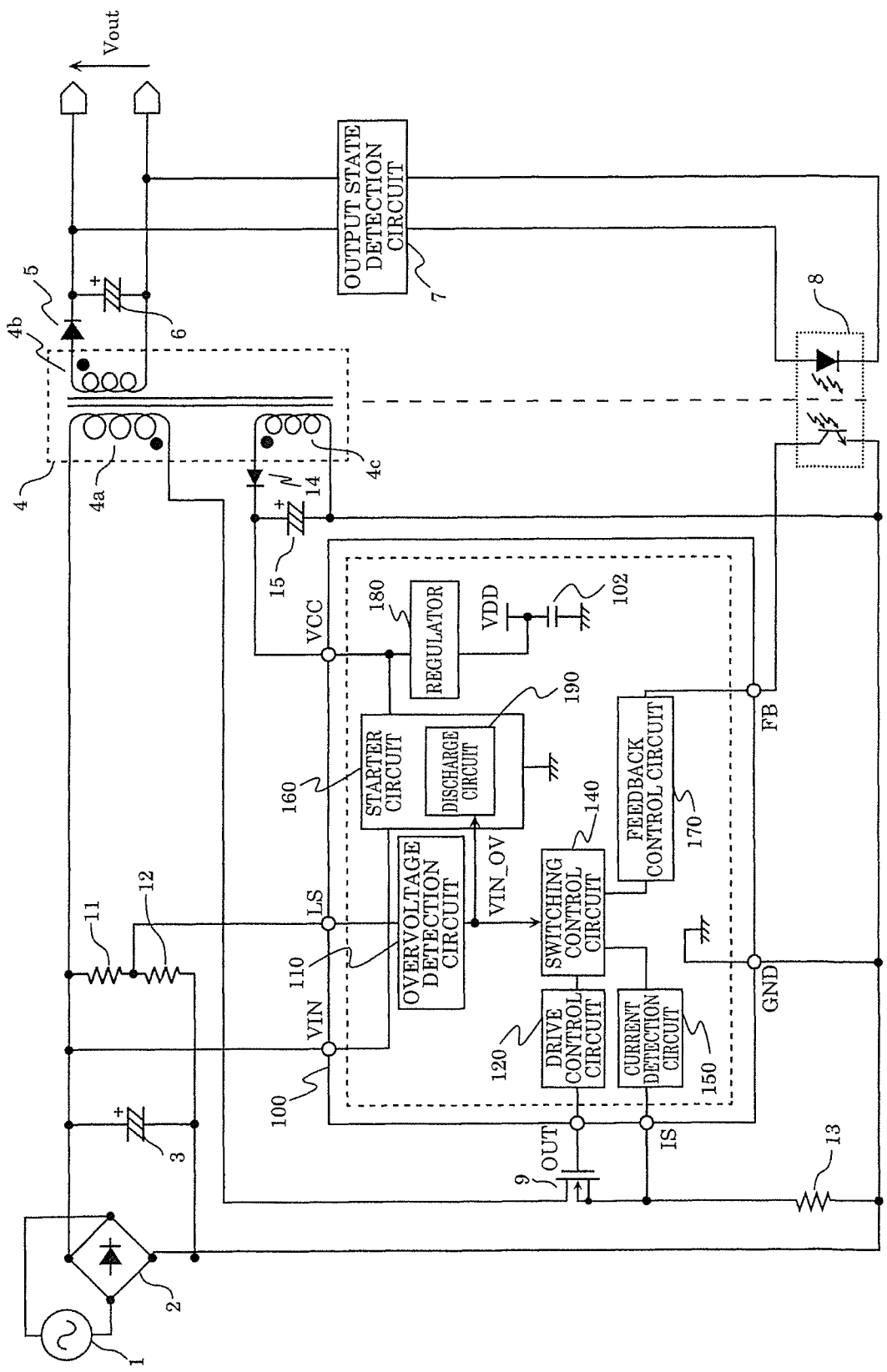
FIG. 1 is a circuit diagram illustrating a configuration of a switching power supply device according to Embodiment 1.

FIG. 1 is a circuit diagram illustrating a configuration of a switching power supply device including a semiconductor device for switching control according to the present embodiment.

In FIG. 1, to AC power supply 1, bridge diodes 2 for rectifying an AC voltage are connected. To bridge diodes 2, smoothing capacitor 3, resistors 11 and 12 for detecting an input voltage, and primary winding 4a of transformer 4 for converting energy are connected.

Transformer 4 includes primary winding 4a, secondary winding 4b, and auxiliary winding 4c. The polarities of primary winding 4a and secondary winding 4b are reverse to each other. There is thus provided a flyback switching power supply device.

To primary winding 4a, bridge diodes 2, smoothing capacitor 3, resistor 11, a VIN terminal, and switching element 9 are connected. A current flowing through primary winding 4a is controlled by switching operation of switching element 9.

To secondary winding 4b, rectifier diode 5 and smoothing capacitor 6 are connected. A flyback voltage generated on secondary winding 4b by the switching operation is rectified and smoothed to generate output voltage Vout.

A semiconductor element such as a power MOSFET is used for switching element 9. Switching element 9 includes a drain terminal, a source terminal, and a gate terminal, and the drain terminal is connected to primary winding 4a of transformer 4. Switching operation of switching element 9 is controlled by a voltage signal applied to the gate terminal (control electrode) from an OUT terminal of semiconductor device 100.

Semiconductor device 100 is integrated on a single semiconductor substrate, and includes seven terminals, as external input/output terminals, namely, the VIN terminal, a VCC terminal, an FB terminal, an LS terminal, the OUT terminal, an IS terminal, and a GND terminal. For example, semiconductor device 100 includes smoothing capacitor 102, overvoltage detection circuit 110, drive control circuit 120, switching control circuit 140, current detection circuit 150, starter circuit 160, feedback control circuit 170, regulator 180, and discharge circuit 190.

The VIN terminal is a high voltage input terminal connecting a connection point between smoothing capacitor 3 and primary winding 4a of transformer 4 to starter circuit 160 built in semiconductor device 100. The VIN terminal is for supplying electric power at startup of semiconductor device 100 from input DC voltage VINDC obtained through rectification and smoothing by bridge diodes 2 and smoothing capacitor 3.

The VCC terminal is an auxiliary power supply terminal which connects an output of a rectifier/smoothing circuit including rectifier diode 14 and smoothing capacitor 15 connected to auxiliary winding 4c to starter circuit 160 and regulator 180 built in semiconductor device 100. The VCC terminal is for supplying electric power to semiconductor device 100 with a voltage obtained through rectification and smoothing of a flyback voltage generated on auxiliary winding 4c by switching operation of switching element 9 serving as auxiliary power supply voltage VCC.

The FB terminal is for inputting a feedback signal (for example, a current from a photocoupler) output from output state detection circuit 7 to feedback control circuit 170 of semiconductor device 100.

The LS terminal is an input detection terminal which connects resistors 11 and 12 for detecting an input voltage to overvoltage detection circuit 110. The LS terminal is for detecting a rise of input DC voltage VINDC applied to both ends of smoothing capacitor 3. The LS terminal may also be used for a low input detection function of detecting a drop of the input voltage.

The OUT terminal is a gate signal output terminal for inputting a drive signal output from drive control circuit 120 built in semiconductor device 100 to the gate terminal of switching element 9.

The IS terminal connects current detection circuit 150 and switching element 9 to resistor 13, and is a current detection terminal for detecting a current flowing through switching element 9.

The GND terminal is a ground terminal which connects GND which is a potential reference of semiconductor device 100 to the terminal on the low voltage side of smoothing capacitor 3.

To detect the input DC voltage VINDC, overvoltage detection circuit 110 is included in an input overvoltage detection circuit along with resistors 11 and 12 for detecting an input voltage. A voltage obtained through resistance division by resistors 11 and 12 is input to overvoltage detection circuit 110. Overvoltage detection circuit 110 compares the input voltage with a preset reference voltage, and outputs input overvoltage detection signal VIN_OV indicating the comparison result to switching control circuit 140 and discharge circuit 190.

Figure 2:
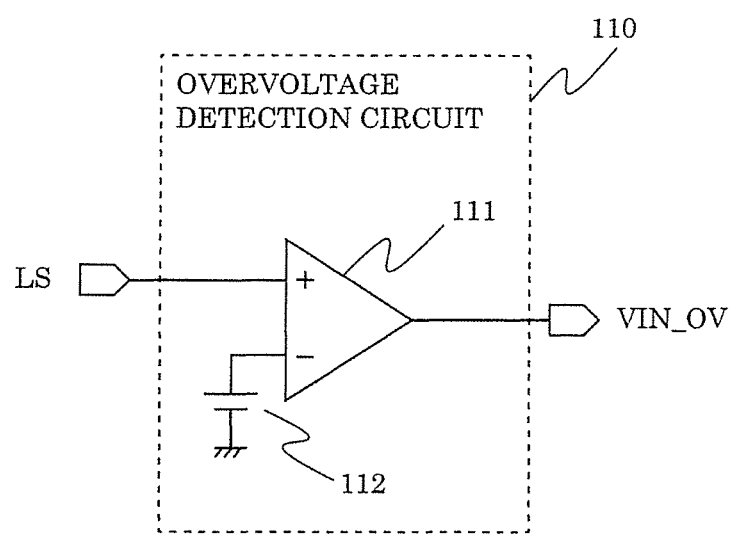
FIG. 2 is a circuit diagram illustrating a configuration of an overvoltage detection circuit according to Embodiment 1.

FIG. 2 is a circuit diagram illustrating a configuration of overvoltage detection circuit 110 according to the present embodiment. Overvoltage detection circuit 110 includes comparator 111 and reference voltage source 112. When the LS terminal voltage is higher than threshold voltage Vth_OV set by reference voltage source 112, input overvoltage detection signal VIN_OV becomes at a high level and is activated. After that, when the LS terminal voltage becomes lower than Vth_OV, input overvoltage detection signal VIN_OV becomes at a low level and is inactivated.

Reference voltage source 112 may have a hysteresis property for preventing misdetection and/or stabilizing operation.

To drive control circuit 120, a signal output from switching control circuit 140 is input. Based on this signal, drive control circuit 120 outputs a drive signal for driving switching element 9.

Figure 3:
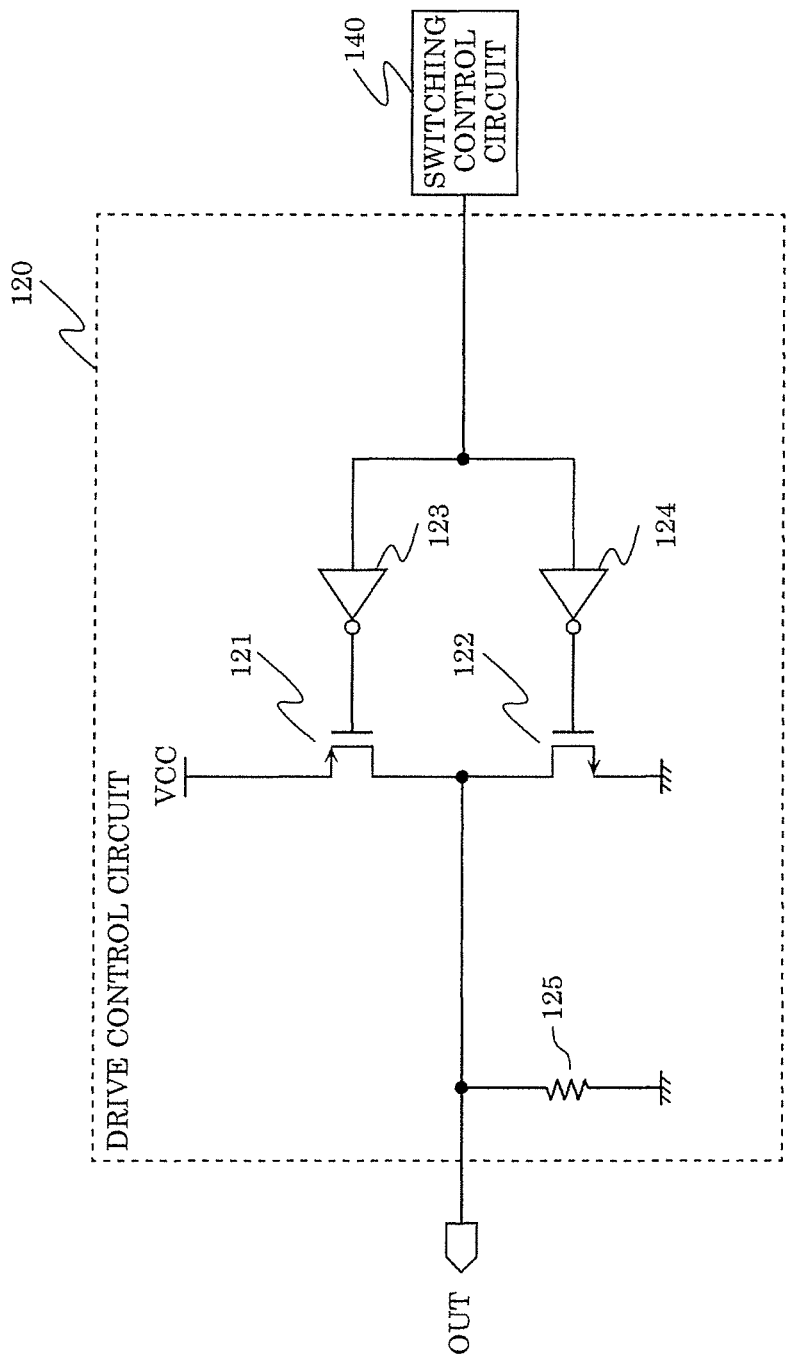
FIG. 3 is a circuit diagram illustrating a configuration of a drive control circuit according to Embodiment 1.

FIG. 3 is a circuit diagram illustrating a configuration of drive control circuit 120 according to the present embodiment. Drive control circuit 120 includes P-type MOSFET 121, N-type MOSFET 122, inverters 123 and 124, resistor 125, and auxiliary power supply voltage VCC. A rectangular signal is input to drive control circuit 120 from switching control circuit 140. For example, when a high level signal is input from switching control circuit 140, a low level signal obtained through inversion by inverter 123 is input to P-type MOSFET 121, and then, P-type MOSFET 121 becomes conductible. A low level signal obtained through inversion by inverter 124 is input to N-type MOSFET 122, and then, N-type MOSFET 122 becomes non-conductible. Thereby, a high level signal of the VCC voltage is output to the OUT terminal.

Meanwhile, when a low level signal is input from switching control circuit 140, P-type MOSFET 121 becomes non-conductible, N-type MOSFET 122 becomes conductible, and a low level signal obtained by grounding to GND is output to the OUT terminal. Drive control circuit 120 outputs these output signals, and thereby, controls switching operation of switching element 9. Resistor 125 herein is a pull-down resistor, and its resistance value is set to be sufficiently large to such an extent that a voltage drop can be ignored.

Switching control circuit 140 is for controlling switching operation of switching element 9, and determines switching operation, turn-on timing, and turn-off timing based on signals input from, for example, overvoltage detection circuit 110, current detection circuit 150, and feedback control circuit 170. Switching control circuit 140 includes a turn-on signal generator circuit such as an oscillator periodically generating turn-on timing and other components.

To current detection circuit 150, a voltage signal appearing on resistor 13 connected to the IS terminal is input in order to detect the current flowing through switching element 9. Current detection circuit 150 compares the input voltage signal with a preset reference voltage, and based on the comparison result, outputs a turn-off signal for switching element 9 to switching control circuit 140. The reference voltage for the comparison may vary in accordance with an output signal from feedback control circuit 170 depending on the switching control scheme of switching control circuit 140.

Starter circuit 160 includes discharge circuit 190, and is connected to the VIN terminal, the VCC terminal, and regulator 180. At startup of the switching power supply device, when input DC voltage VINDC is applied to the VIN terminal, starting currents flow from the VIN terminal through smoothing capacitor 15 via starter circuit 160 and the VCC terminal, and through smoothing capacitor 102 via starter circuit 160 and regulator 180. When smoothing capacitors 15 and 102 are charged, the VCC terminal voltage and circuit internal voltage VDD of semiconductor device 100 rise, and the VCC terminal voltage and circuit internal voltage VDD of semiconductor device 100 reach respective starting voltages, starter circuit 160 cuts off the starting currents. Moreover, starter circuit 160 is monitoring the VCC terminal voltage in order to determine whether switching operation of switching element 9 is possible or not. Therefore, although not shown in the figure, starter circuit 160 outputs start signals and stop signals to, for example, switching control circuit 140.

Discharge circuit 190 is configured as a part of starter circuit 160 in order to forcibly discharge the stored charge of smoothing capacitor 3, and is connected to overvoltage detection circuit 110. To discharge circuit 190, input overvoltage detection signal VIN_OV is input. Discharge circuit 190 is discharging the stored charge of smoothing capacitor 3 during a period when an input overvoltage is being detected.

Figure 4:
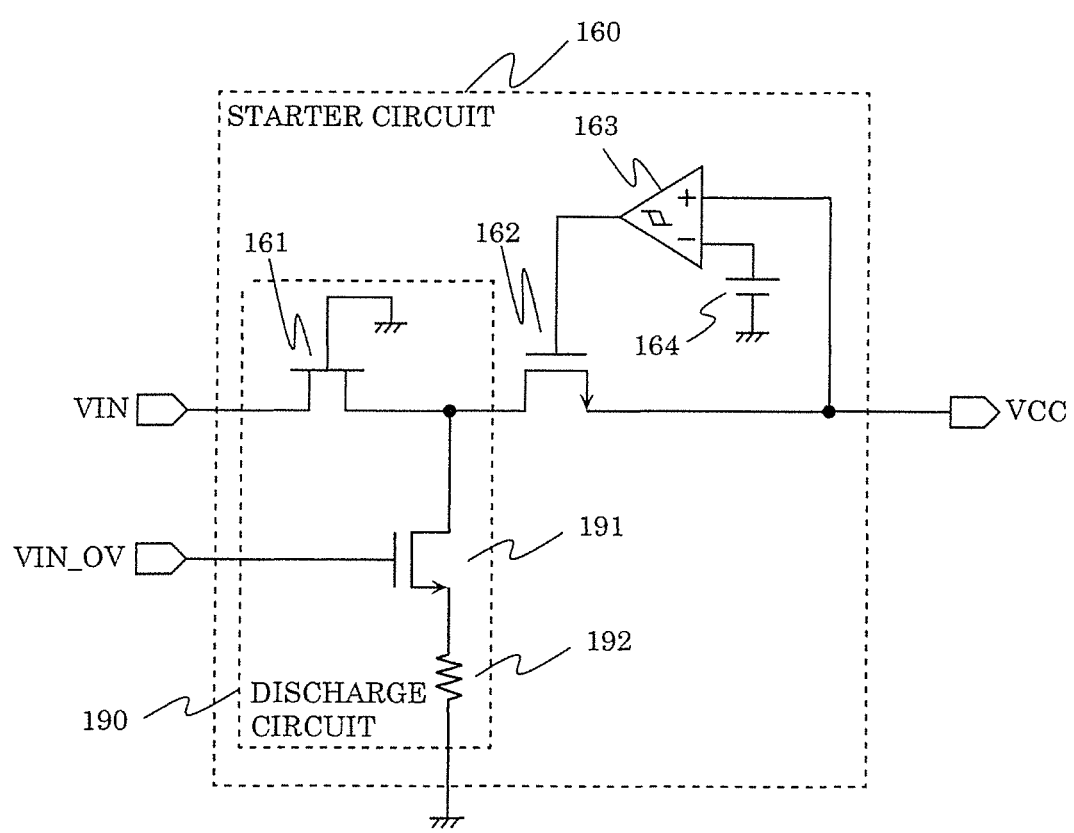
FIG. 4 is a circuit diagram illustrating a configuration of a starter circuit and a discharge circuit according to Embodiment 1.

FIG. 4 is a circuit diagram exemplarily illustrating a configuration of starter circuit 160 and discharge circuit 190 according to the present embodiment. Starter circuit 160 includes of N-type MOSFET 162, comparator 163 with hysteresis, reference voltage source 164, and discharge circuit 190. Discharge circuit 190 includes junction field-effect transistor (JFET) 161, N-type MOSFET 191, and resistor 192. These elements are connected as shown in FIG. 4. Junction field-effect transistor (JFET) 161 is shared by the two circuits of starter circuit 160 and discharge circuit 190, and is used in startup operation of semiconductor device 100 and in discharge operation of the stored charge, respectively.

When input overvoltage detection signal VIN_OV is input to N-type MOSFET 191, N-type MOSFET 191 becomes conductible, and forcibly discharges the stored charge of smoothing capacitor 3 through the path of the VIN terminal, JFET 161, N-type MOSFET 191, and resistor 192. The discharge current is restricted by resistor 192.

To feedback control circuit 170, the feedback signal output from output state detection circuit 7 is input via the FB terminal. Feedback control circuit 170 sets a current flowing through switching element 9 or a switching frequency so as to stabilize output voltage Vout to be constant, and outputs a control signal to switching control circuit 140.

Regulator 180 generates circuit internal voltage VDD for semiconductor device 100 by converting the VCC terminal voltage, and supplies circuit internal voltage VDD to semiconductor device 100.

By transformer 4 for energy conversion, switching element 9 for switching operation, and semiconductor device 100 for controlling operation of the switching element described above, input electric power is converted into desired output electric power.

Output state detection circuit 7 herein includes a detection resistor, a Zener diode, and a shunt regulator, for example. Output state detection circuit 7 detects the voltage level of output voltage Vout, and outputs the feedback signal to semiconductor device 100 via photocoupler 8 such that output voltage Vout is stabilized to be a predetermined voltage. Output voltage Vout may be detected using a flyback voltage arising on auxiliary winding 4c of transformer 4, or may be detected using the VCC voltage after rectification and smoothing by rectifier diode 14 and smoothing capacitor 15.

Operation of the switching power supply device and the semiconductor device for switching control configured as above shown in FIG. 1 is described.

When AC power supply voltage VINAC is input from AC power supply 1 such as a commercial power supply, input DC voltage VINDC is generated through rectification and smoothing of AC power supply voltage VINAC by bridge diodes 2 and smoothing capacitor 3. Input DC voltage VINDC thus generated is supplied to starter circuit 160 in semiconductor device 100 through the VIN terminal, and the starting current flows through capacitor 15 connected to the VCC terminal. When the VCC terminal voltage is rising and the VCC terminal voltage reaches the starting voltage set by starter circuit 160, switching element 9 starts switching control.

Once switching element 9 is turned on, a current flows through switching element 9 and resistor 13, and a voltage signal according to the measurement of the current is input to current detection circuit 150. When this voltage signal rises not less than the preset reference voltage, switching element 9 is turned off.

When switching element 9 is turned off, energy having been stored by a current flowing through the primary side of transformer 4 during the turn-on period of switching element 9 is transmitted to the secondary side of transformer 4.

Switching operation as above is repeated, and output voltage Vout is rising. When output voltage Vout becomes not less than a predetermined voltage set by output state detection circuit 7, output state detection circuit 7 and photocoupler 8 performs control so as to cause a current to flow out from the FB terminal of semiconductor device 100 as the feedback signal. Based on the measurement of this flow-out current, feedback control circuit 170 regulates the current flowing through switching element 9 or the switching frequency.

Specifically, feedback control circuit 170 sets the current flowing through switching element 9 or the switching frequency to be low in light load in which current supply to a load connected to the switching power supply device is small, and sets the current flowing through switching element 9 or the switching frequency to be high in heavy load. As above, semiconductor device 100 controls output voltage Vout to be stabilized at a predetermined voltage while changing the current flowing through switching element 9 or the switching frequency in accordance with the electric power supplied to the load connected to the switching power supply device.

Figure 5:
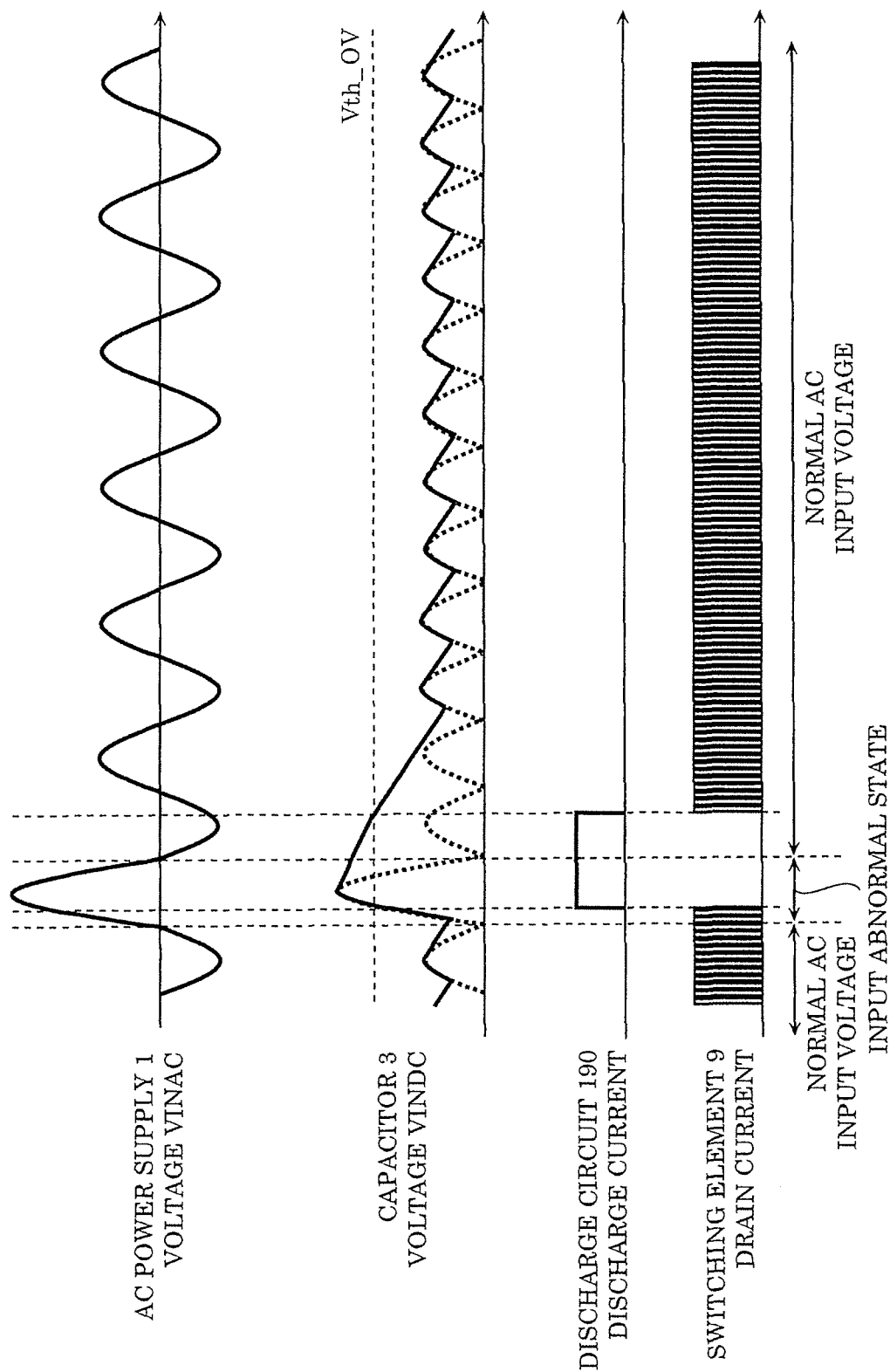
FIG. 5 is a timing chart illustrating a case where an input overvoltage protection function operates in the switching power supply device according to Embodiment 1.

Next, referring to a timing chart shown in FIG. 5, operation of the switching power supply according to Embodiment 1 in the case where an input overvoltage is input from AC power supply 1 is described.

When an input overvoltage exceeding a supposed voltage range is applied from AC power supply 1 due to some abnormality or the similar factor, input DC voltage VINDC which is the voltage across the terminals of smoothing capacitor 3 rises. Therefore, the LS terminal voltage which is the voltage obtained by reducing this input DC voltage VINDC through resistance division also rises. This LS terminal voltage is input to overvoltage detection circuit 110. Overvoltage detection circuit 110 including reference voltage source 112 and comparator 111 inverts input overvoltage detection signal VIN_OV which is the output of comparator 111 at the high level to activate input overvoltage detection signal VIN_OV when the LS terminal voltage becomes higher than threshold voltage Vth_OV set by reference voltage source 112. Overvoltage detection circuit 110 outputs this input overvoltage detection signal VIN_OV to switching control circuit 140 and N-type MOSFET 191 of discharge circuit 190. When switching control circuit 140 receives input overvoltage detection signal VIN_OV, switching control circuit 140 outputs a low level signal to drive control circuit 120 so as to stop switching operation of switching element 9. Drive control circuit 120 resultantly stops switching operation of switching element 9, and thereby, input overvoltage protection operates.

When input overvoltage detection signal VIN_OV is activated, N-type MOSFET 191 of discharge circuit 190 becomes conductible simultaneously to the stop of the switching operation, which starts to forcibly discharge the stored charge of smoothing capacitor 3.

After that, when the input overvoltage applied from AC power supply 1 is recovered to be normal, input DC voltage VINDC quickly drops through the forced discharge by discharge circuit 190. The LS terminal voltage input to overvoltage detection circuit 110 also simultaneously drops to reach threshold voltage Vth_OV. When the LS terminal voltage becomes lower than threshold voltage Vth_OV, overvoltage detection circuit 110 inverts input overvoltage detection signal VIN_OV at the low level to inactivate input overvoltage detection signal VIN_OV. Overvoltage detection circuit 110 outputs input overvoltage detection signal VIN_OV thus inactivated to switching control circuit 140 and N-type MOSFET 191 of discharge circuit 190. Therefore, switching control circuit 140 outputs a signal based on feedback control circuit 170 and current detection circuit 150 to drive control circuit 120 to resume the switching operation. In discharge circuit 190, N-type MOSFET 191 becomes non-conductible to stop forcibly discharging smoothing capacitor 3.

Figure 18:
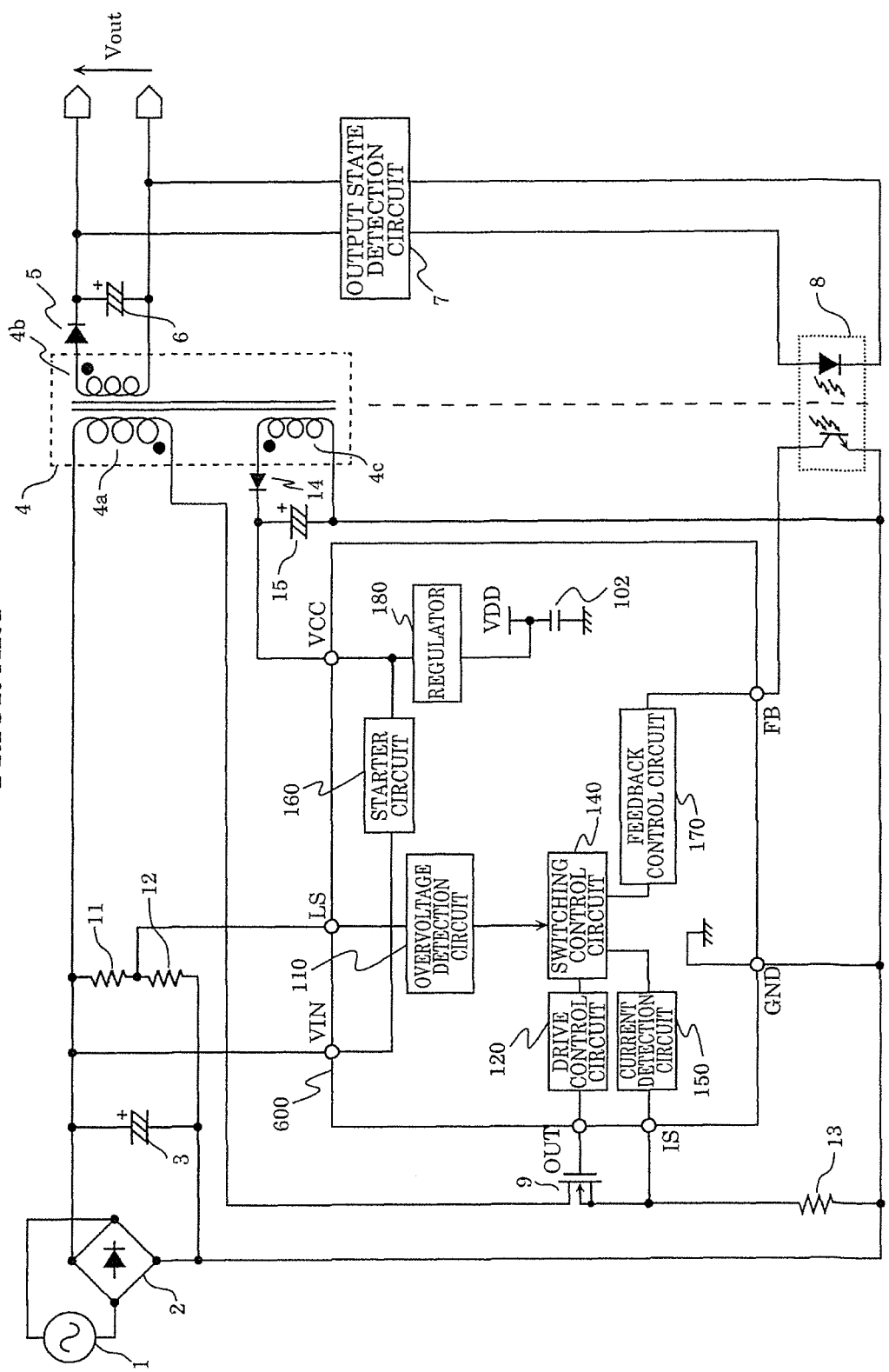
FIG. 18 is a circuit diagram illustrating a configuration of a switching power supply device including a conventional input overvoltage detection circuit.
Figure 19:
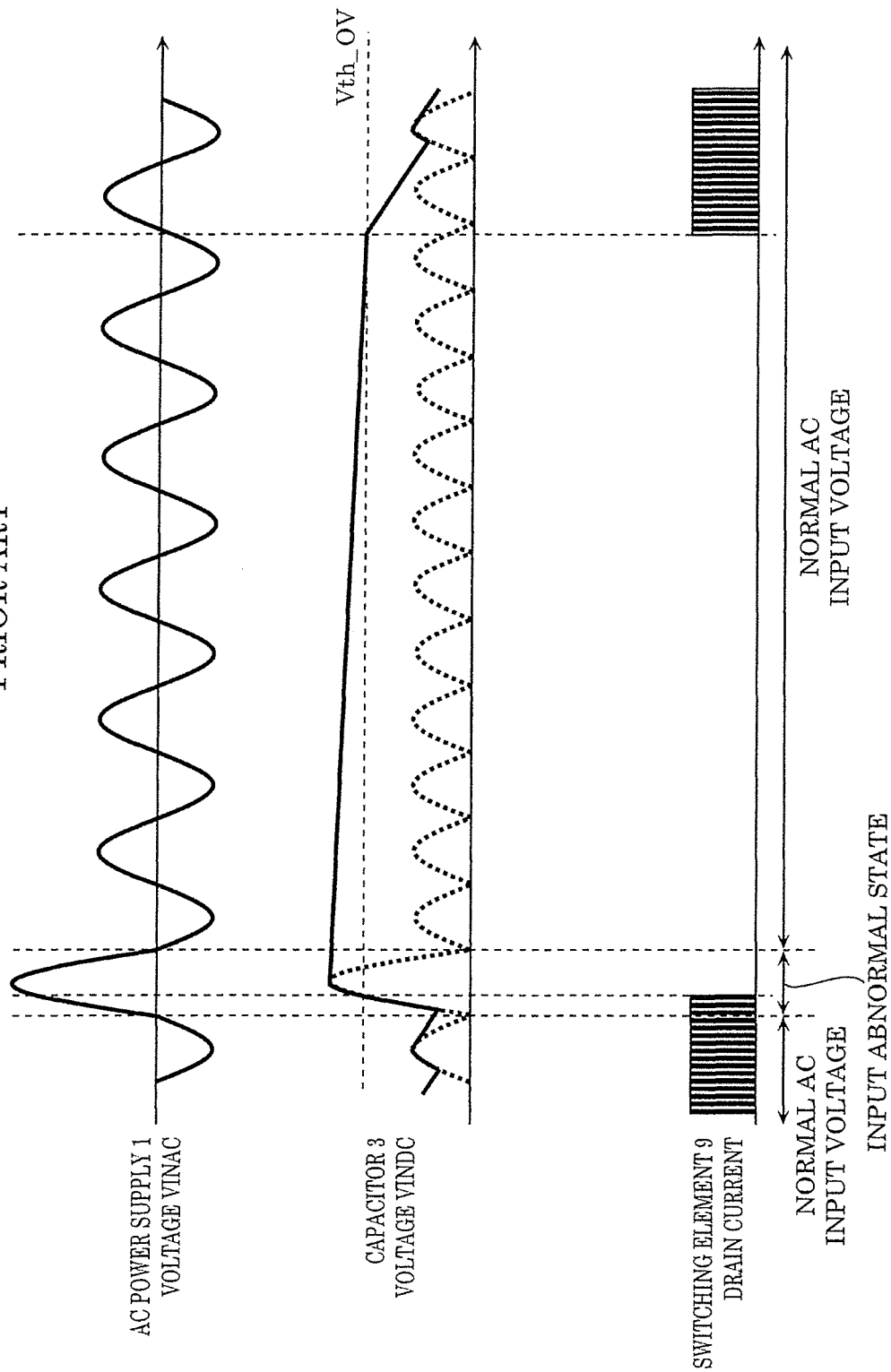
FIG. 19 is a timing chart illustrating a case where an input overvoltage protection function operates in a switching power supply device including a conventional input overvoltage detection circuit.

As above, the switching power supply device of Embodiment 1 can make input DC voltage VINDC quickly drop after the applied input overvoltage is recovered to be normal after input overvoltage protection operates. Hence, the state of overvoltage detection can be quickly released, and the switching operation can be early resumed. Accordingly, the problem that a conventional switching power supply device as shown in FIG. 18 is very late to resume switching operation can be solved.

The discharge current amount of discharge circuit 190 may be limited to be a fixed value or may be changed. For example, the discharge current amount of discharge circuit 190 may be changed in inverse proportion to the rise of the temperature of semiconductor device 100. In this case, excessive heat generation of semiconductor device 100 due to the discharge current, breakage of semiconductor device 100 due to the heat generation, and the similar situation can be prevented. Moreover, the discharge current amount of discharge circuit 190 may be changed in proportion to the voltage input to the LS terminal. In this case, the discharge current is made larger as the value of the input overvoltage is larger, and thereby, input DC voltage VINDC can be made drop earlier. Thereby, switching operation of switching element 9 can be early resumed.

The discharge current may be discharged by charging, with this discharge current, a capacitor external to the control circuit, such, for example, as smoothing capacitor 15. In this case, discharge circuit 190 is configured not to include N-type MOSFET 191 or resistor 192, and N-type MOSFET 162 is configured to be forcibly made conductible when input overvoltage detection signal VIN_OV is activated at the high level. In input overvoltage, input overvoltage detection signal VIN_OV is activated and N-type MOSFET 162 becomes conductible, and the stored charge of smoothing capacitor 3 moves to smoothing capacitor 15 since the voltage of smoothing capacitor 15 is lower than input DC voltage VINDC of smoothing capacitor 3. Thus, the stored charge of smoothing capacitor 3 can be discharged not using N-type MOSFET 191 or resistor 192 as elements dedicated for discharge.

While a configuration of a flyback switching power supply device has been described above, a topologically different configuration may be applicable, such as a step-down chopper one.

Embodiment 2

Next, a switching power supply device and a semiconductor device according to Embodiment 2 are described with reference to FIG. 6 to FIG. 8.

In Embodiment 1, the LS terminal is provided as an input detection terminal in semiconductor device 100 in order to detect the rise of input DC voltage VINDC, and smoothing capacitor 3 is discharged with N-type MOSFET 191 and resistor 192 which are elements dedicated for discharge via junction field-effect transistor (JFET) 161. For Embodiment 2, a switching power supply device in which such an input detection terminal and elements dedicated for discharge are not provided is described. Duplicate description the same or similar to that for Embodiment 1 is omitted.

Figure 6:
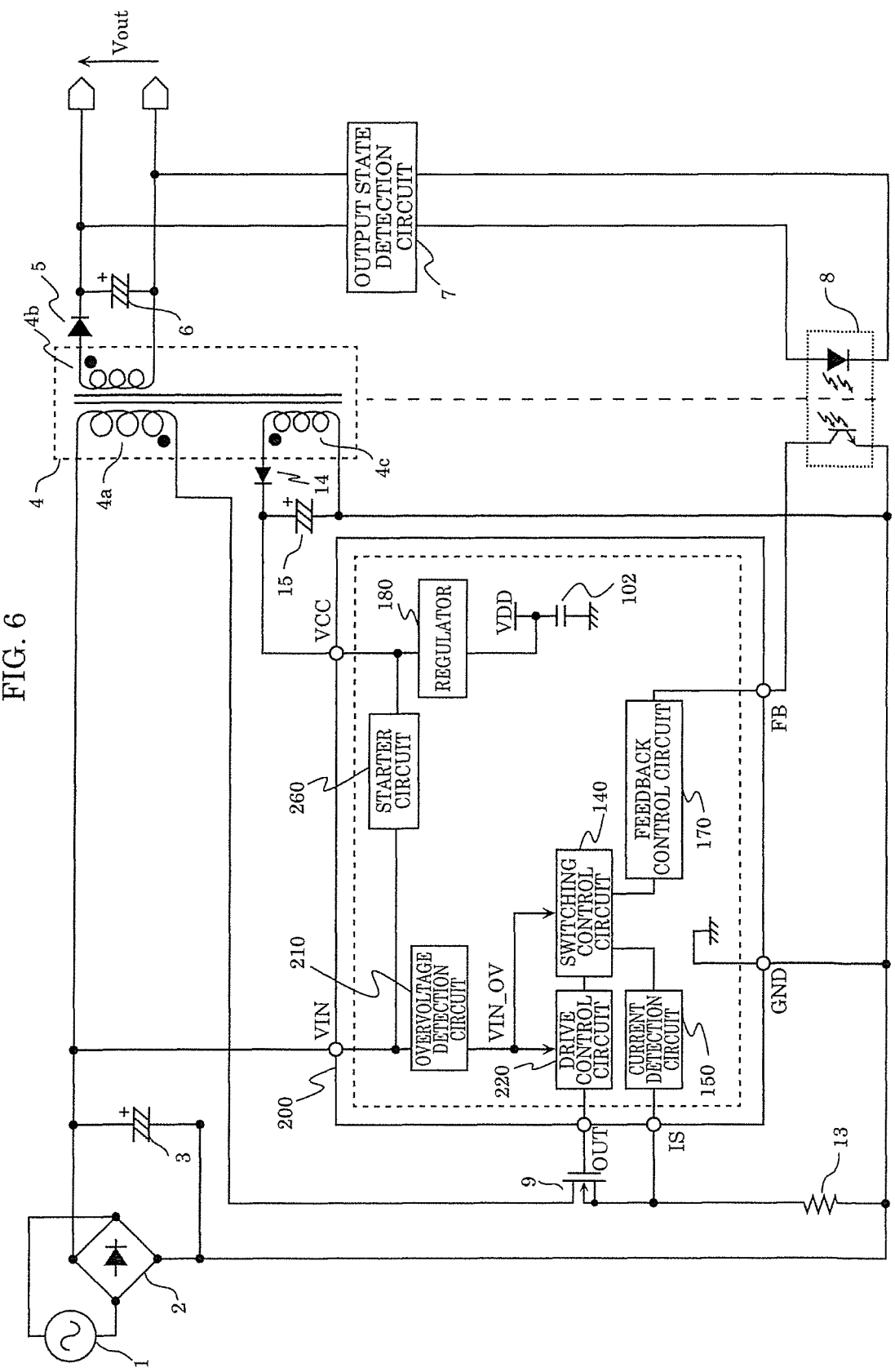
FIG. 6 is a circuit diagram illustrating a configuration of a switching power supply device according to Embodiment 2.

FIG. 6 is a circuit diagram exemplarily illustrating a configuration of a switching power supply device of Embodiment 2. FIG. 6 is different from FIG. 1 illustrating the switching power supply device of Embodiment 1 in that overvoltage detection circuit 210 of semiconductor device 200 is connected to the VIN terminal, that input overvoltage detection signal VIN_OV is input to switching control circuit 140 and drive control circuit 220, and that discharge circuit 190 is eliminated. The elimination of discharge circuit 190 indicates that N-type MOSFET 191 and resistor 192 which are elements dedicated for discharge are eliminated, and JFET 161 also used for starting operation of semiconductor device 200 is not eliminated but still disposed in starter circuit 260.

Figure 7:
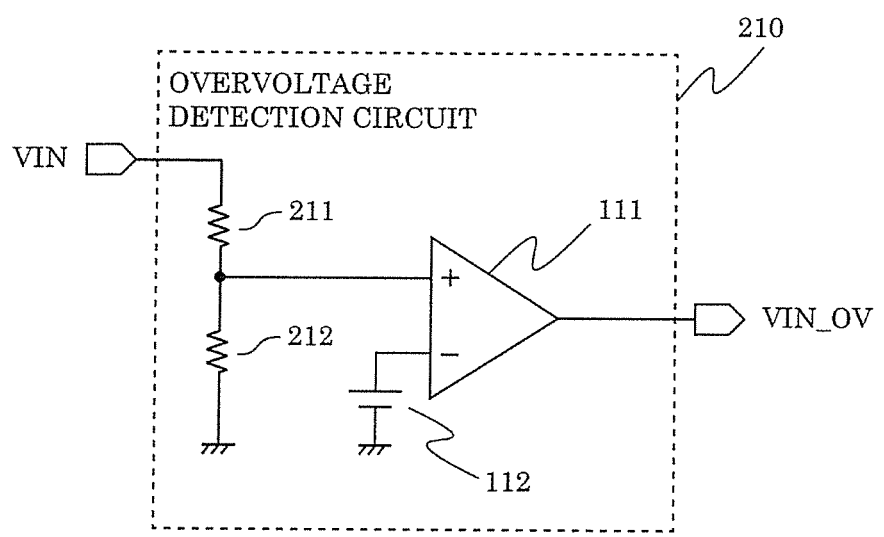
FIG. 7 is a circuit diagram illustrating a configuration of an overvoltage detection circuit according to Embodiment 2.

FIG. 7 is a circuit diagram exemplarily illustrating a configuration of overvoltage detection circuit 210 of Embodiment 2. FIG. 7 compared with FIG. 2 illustrating overvoltage detection circuit 110 of Embodiment 1, the VIN terminal voltage is input in place of the LS terminal voltage, and resistors 211 and 212 for detecting an input voltage are connected to comparator 111.

Figure 8:
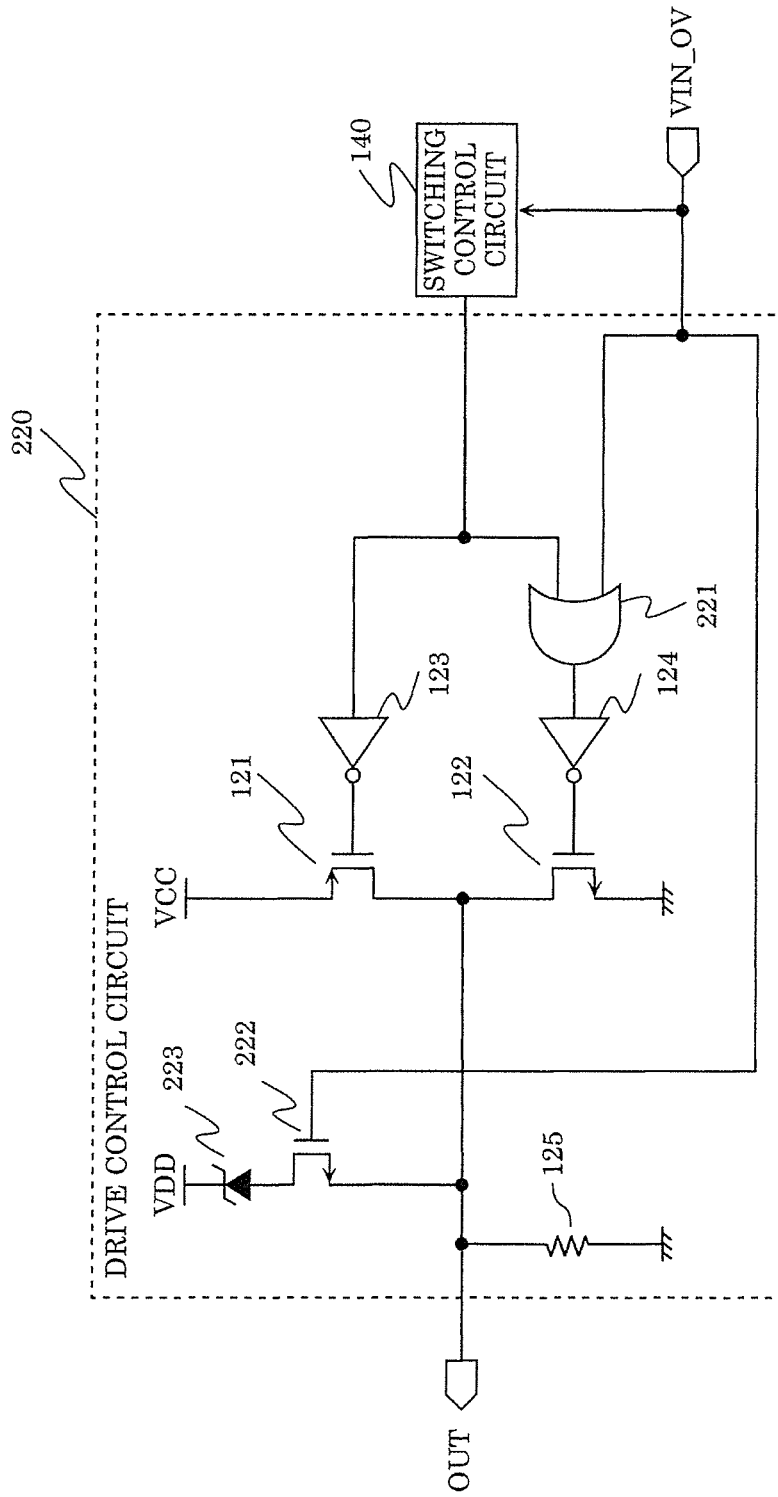
FIG. 8 is a circuit diagram illustrating a configuration of a drive control circuit according to Embodiment 2.

FIG. 8 is a circuit diagram exemplarily illustrating a configuration of drive control circuit 220 of Embodiment 2. FIG. 8 compared with FIG. 3 showing drive control circuit 120 of Embodiment 1, the input of VIN_OV, OR circuit 221, N-type MOSFET 222, Zener diode 223, and circuit internal voltage VDD are added and connected as in FIG. 8. In drive control circuit 220, when the input voltage is normal, a signal reverse in level to the signal of switching control circuit 140 is input to P-type MOSFET 121 and N-type MOSFET 122, P-type MOSFET 121 and N-type MOSFET 122 complementarily operate, and thereby, a rectangular voltage signal is output to the OUT terminal. Thus, drive control circuit 220 controls switching operation of switching element 9.

Operation of the switching power supply device and the semiconductor device according to Embodiment 2 configured as above is described mainly on methods of input overvoltage detection and discharge which are different from those in Embodiment 1.

When an input overvoltage is applied from AC power supply 1, input DC voltage VINDC which is the voltage across the terminals of smoothing capacitor 3 rises, and this voltage is input to overvoltage detection circuit 210 as the VIN terminal voltage. The input VIN terminal voltage is reduced through resistance division by resistors 211 and 212, and the reduced VIN terminal voltage is input to comparator 111. When the reduced VIN terminal voltage becomes higher than threshold voltage Vth_OV set by reference voltage source 112 and resistors 211 and 212, input overvoltage detection signal VIN_OV which is the output of comparator 111 is inverted at the high level to be activated, and is output to switching control circuit 140 and drive control circuit 220. When input overvoltage detection signal VIN_OV is activated, switching control circuit 140 outputs a low level signal. In drive control circuit 220, P-type MOSFET 121 and N-type MOSFET 122 become non-conductible, and N-type MOSFET 222 becomes conductible since the low level signal is input from switching control circuit 140 when the input overvoltage detection signal VIN_OV is activated. The voltage of the OUT terminal drops due to resistor 125 when auxiliary power supply voltage VCC is output. Otherwise, the voltage of the OUT terminal rises since N-type MOSFET 222 is conductible when the low level signal is output. In both cases, the voltage of the OUT terminal is finally about a voltage obtained by subtracting the Zener voltage of Zener diode 223 from circuit internal voltage VDD, and is output from the OUT terminal. Thus, during a period when input overvoltage detection signal VIN_OV is activated, switching element 9 is conductible due to input of the voltage signal from the OUT terminal, and the stored charge of the smoothing capacitor is forcibly discharged through the path of primary winding 4a of transformer 4, switching element 9, and resistor 13. Since switching element 9 operates at a lower voltage than the drive voltage VCC in normal switching operation, the discharge current flowing through switching element 9 can be restricted to a smaller current than that in normal switching operation.

After that, when the input overvoltage applied from AC power supply 1 is recovered to be normal, input DC voltage VINDC drops. When the VIN terminal voltage becomes lower than threshold voltage Vth_OV set by reference voltage source 112 and resistors 211 and 212, overvoltage detection circuit 210 inverts input overvoltage detection signal VIN_OV at the low level to inactivate input overvoltage detection signal VIN_OV, and outputs this input overvoltage detection signal VIN_OV to switching control circuit 140 and drive control circuit 220. Thereby, drive control circuit 220 makes N-type MOSFET 222 non-conductible, and stops the forcible discharge of smoothing capacitor 3. Moreover, switching control circuit 140 outputs a signal based on feedback control circuit 170 and current detection circuit 150 to drive control circuit 220 to resume normal switching operation.

As above, in the switching power supply device according to Embodiment 2, an input detection terminal can be eliminated by detecting the input overvoltage with the VIN terminal. Furthermore, elements dedicated for discharging can be eliminated by sharing switching element 9 used for normal switching operation for discharging the stored charge. As above, the switching power supply device can be rationalized.

The output voltage signal to the OUT terminal during a period when input overvoltage detection signal VIN_OV of drive control circuit 220 is activated may be limited to be a fixed value or may be changed. For example, the output voltage signal may be changed in proportion to the voltage input to the VIN terminal. In this case, the discharge current can be made larger as the value of the input overvoltage is larger. As a result, input DC voltage VINDC can be made drop earlier. Thus, switching operation of switching element 9 can be earlier resumed.

Discharge may be performed using JFET 161 via the VIN terminal. In this case, the discharge can be performed through the path of the VIN terminal, JFET 161, N-type MOSFET 191, and resistor 192 by using drive control circuit 120 of Embodiment 1 shown in FIG. 3 and adding discharge circuit 190. As a result, the input overvoltage is detected through the VIN terminal, thereby, an input detection terminal can be eliminated, and the switching power supply device can be rationalized.

While a configuration of a flyback switching power supply device has been described above, a topologically different configuration may be applicable, such as a step-down chopper one.

Embodiment 3

Next, a switching power supply device and a semiconductor device according to Embodiment 3 are described with reference to FIG. 9.

There is provided in Embodiment 1 a switching power supply device in which switching element 9 is configured as another element in a separate package different from another package for semiconductor device 100. For Embodiment 3, a switching power supply device in which these elements are formed into a single package as a single element is described. Duplicate description the same or similar to that for Embodiment 1 is omitted.

Figure 9:
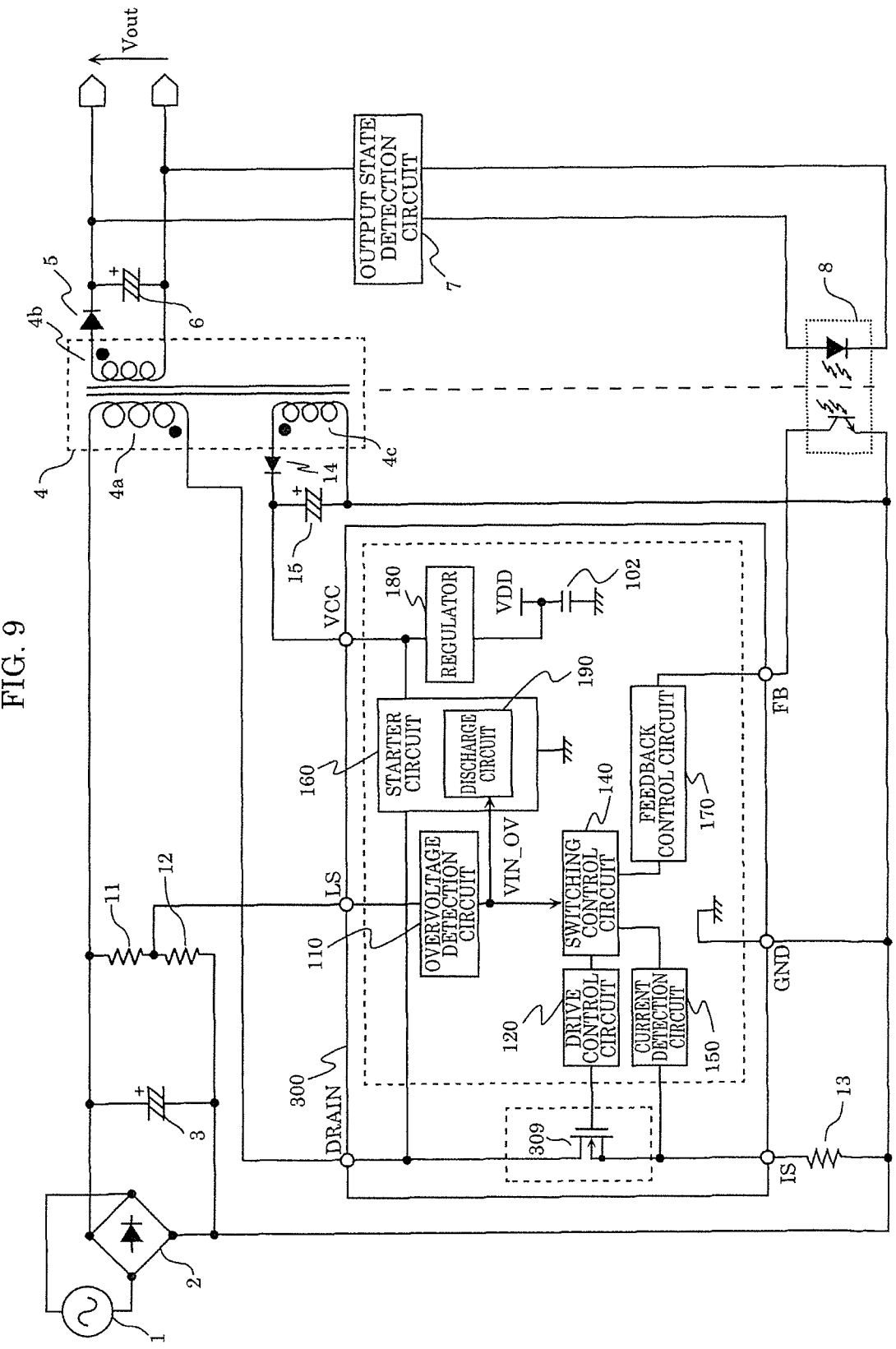
FIG. 9 is a circuit diagram illustrating a configuration of a switching power supply device according to Embodiment 3.

FIG. 9 is a circuit diagram exemplarily illustrating a configuration of a switching power supply device of Embodiment 3. FIG. 9 is different from FIG. 1 illustrating the switching power supply device of Embodiment 1 in that switching element 309 is built in semiconductor device 300, that a DRAIN terminal is provided in place of the VIN terminal, and that the DRAIN terminal is connected to primary winding 4a of transformer 4, the drain terminal of switching element 309, and starter circuit 160. It should be noted that in semiconductor device 300, switching element 309 and a portion except the switching element are formed on different semiconductor substrates, and that these are configured into a single package as a single semiconductor device.

Operation of the switching power supply device and the semiconductor device according to Embodiment 3 configured as above is described mainly on operation in the vicinity of the DRAIN terminal different from Embodiment 1.

First, normal operation is described. Input DC voltage VINDC is input to the DRAIN terminal via primary winding 4a of transformer 4. Electric power is supplied from the DRAIN terminal to auxiliary power supply voltage VCC via starter circuit 160, and thereby, semiconductor device 300 is started to start switching control of switching element 309.

Next, when an input overvoltage is detected, input overvoltage detection signal VIN_OV is activated, and switching element 309 stops switching operation by drive control circuit 120. Simultaneously, input overvoltage detection signal VIN_OV is input also to N-type MOSFET 191 of discharge circuit 190, thereby, N-type MOSFET 191 becomes conductible, and the stored charge of smoothing capacitor 3 is forcibly discharged through the path of primary winding 4a of transformer 4, the DRAIN terminal, JFET 161, N-type MOSFET 191, and resistor 192.

Next, when the input voltage drops and input overvoltage detection signal VIN_OV is inactivated, switching control circuit 140 outputs a signal based on feedback control circuit 170 and current detection circuit 150 to drive control circuit 120 to resume normal switching operation. In discharge circuit 190, N-type MOSFET 191 becomes non-conductible, and discharge circuit 190 stops forcibly discharging smoothing capacitor 3.

As above, in the switching power supply device according to Embodiment 3, a high voltage terminal dedicated for discharge can be eliminated by using JFET 161 via the DRAIN terminal for discharge even with a structure in which switching element 309 is built in the same package for semiconductor device 300. Thus, the switching power supply device can be rationalized.

The discharge may be performed using switching element 309 and resistor 13 via the DRAIN terminal. In this case, discharge circuit 190 can be eliminated.

While a configuration of a flyback switching power supply device has been described above, a topologically different configuration may be applicable, such as a step-down chopper one.

Variation of Embodiment 3

Figure 10:
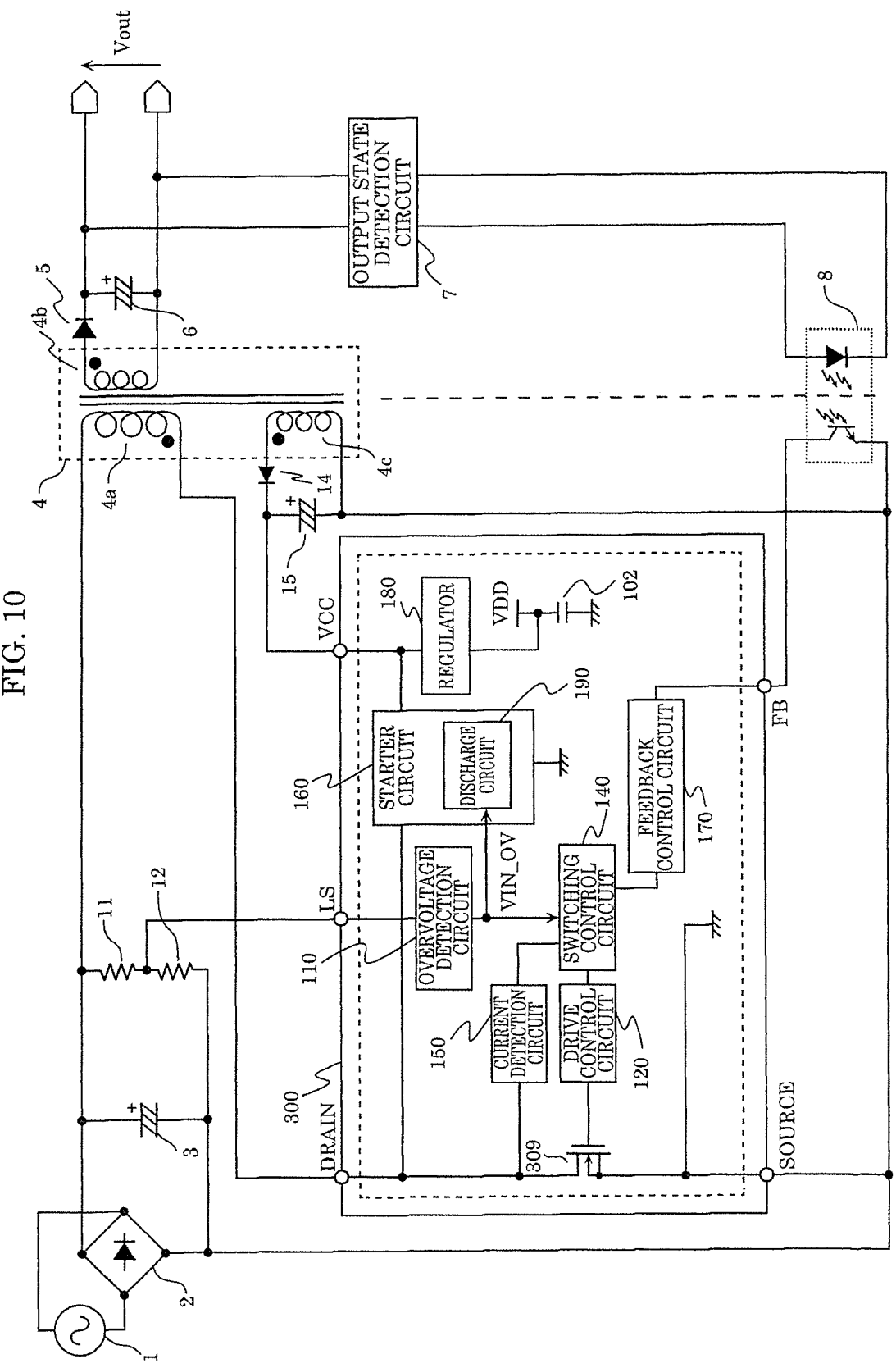
FIG. 10 is a circuit diagram illustrating a configuration of a switching power supply device according to a variation of Embodiment 3.

A variation of the switching power supply device of Embodiment 3 is described with reference to FIG. 10. While a switching power supply device according to a variation of Embodiment 3 is approximately the same as the switching power supply device of Embodiment 3, as compared with Embodiment 3, a configuration inside semiconductor device 300 is different.

There is provided in Embodiment 3 a semiconductor device in which switching element 309 is formed on a semiconductor substrate different from that for a portion, of semiconductor device 300, except switching element 309, and switching element 309 and the portion are configured into a single package as semiconductor device 300. In the switching power supply device of the present variation shown in FIG. 10, switching element 309 and the portion are formed on a single semiconductor substrate and configured into a single package. GND of the portion, of semiconductor device 300, except switching element 309 is connected to the source terminal of switching element 309. In current detection circuit 150, resistor 13 is eliminated in order to detect an ON-voltage of switching element 309.

The stored charge can be discharged using JFET 161 via the DRAIN terminal similarly to Embodiment 3 since the circuits in semiconductor device 300 are configured into a single package.

As above, in the present variation, a high voltage terminal dedicated for discharge can be eliminated similarly to Embodiment 3 even with a different configuration of semiconductor device 300. Thus, the switching power supply device can be rationalized.

Embodiment 4

Figure 12:
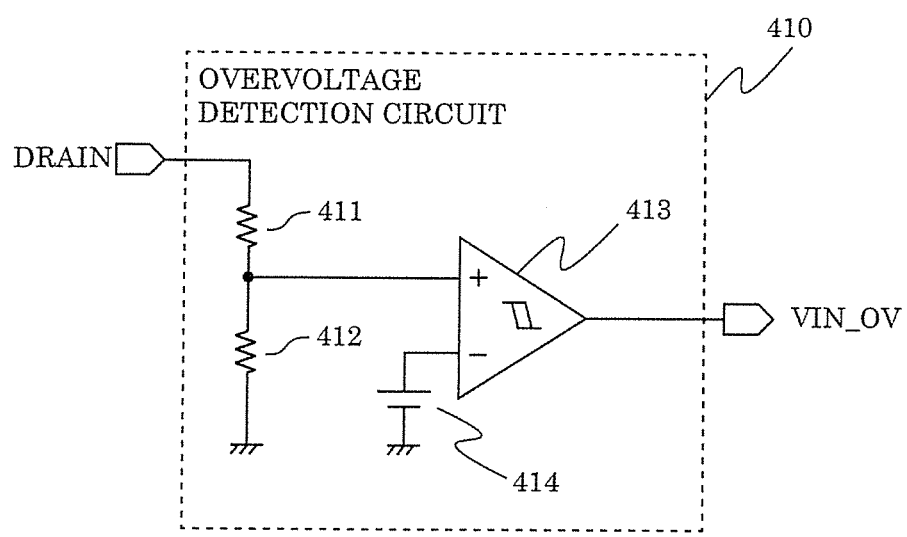
FIG. 12 is a circuit diagram illustrating a configuration of an overvoltage detection circuit according to Embodiment 4.
Figure 13:
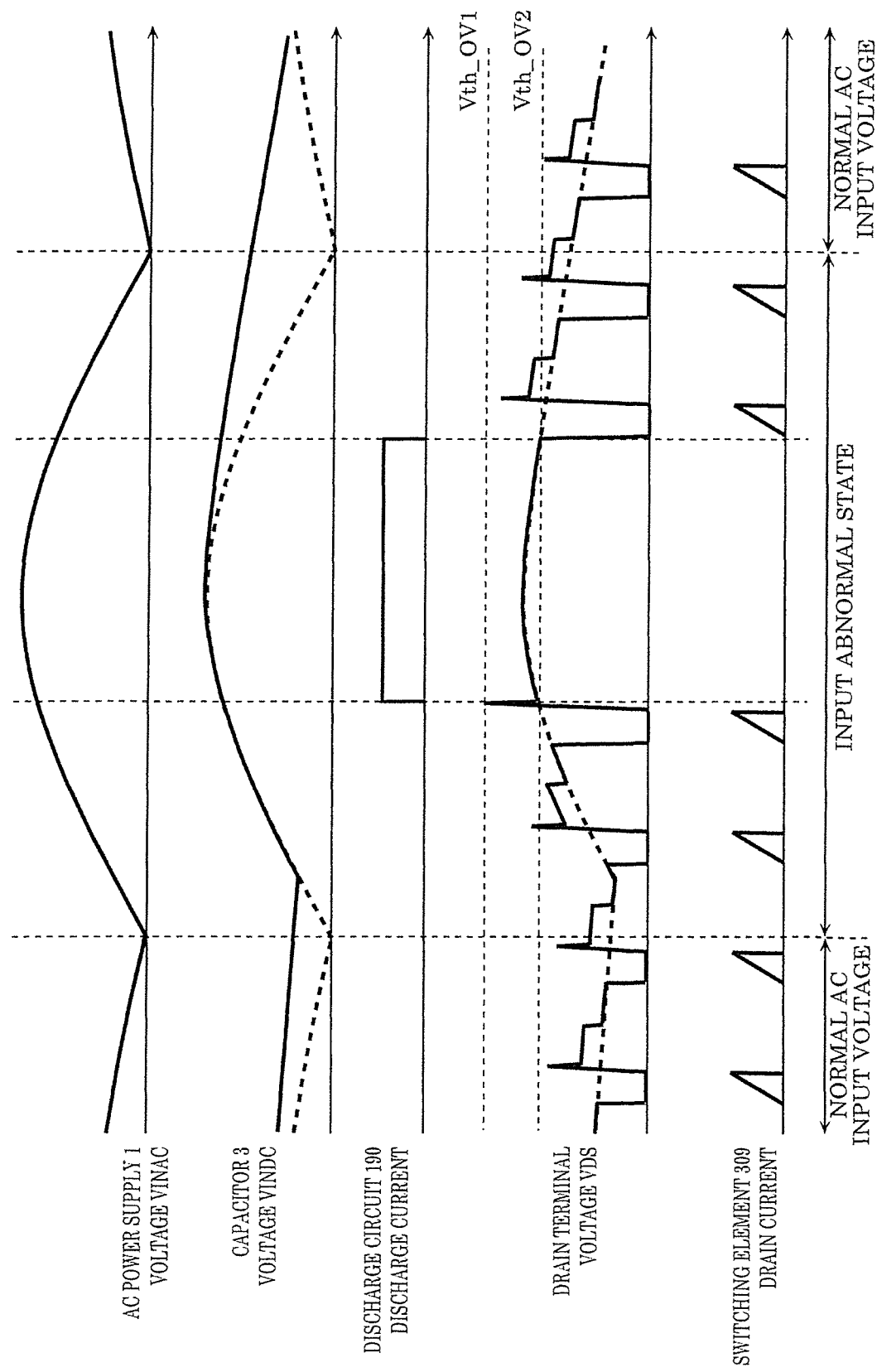
FIG. 13 is a timing chart illustrating a case where an input overvoltage protection function operates in the switching power supply device according to Embodiment 4.

Next, a switching power supply device and a semiconductor device according to Embodiment 4 are described with reference to FIG. 11 to FIG. 13.

There is provided in Embodiment 3 a switching power supply device in which the LS terminal is provided as an input detection terminal in semiconductor device 300 in order to detect input DC voltage VINDC. For Embodiment 4, a switching power supply device in which an input detection terminal is not provided is described. Duplicate description the same or similar to that for Embodiment 3 is omitted.

Figure 11:
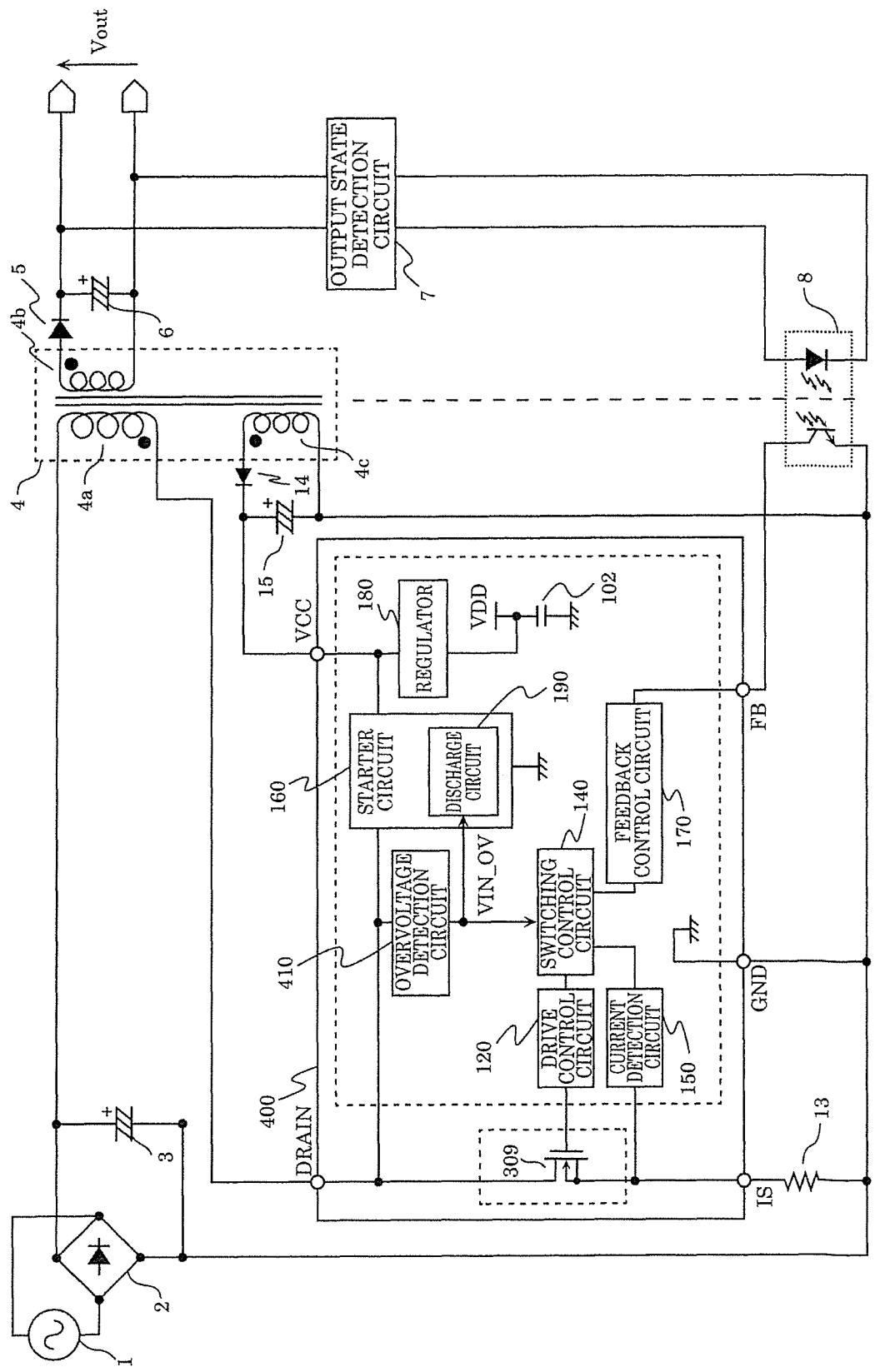
FIG. 11 is a circuit diagram illustrating a configuration of a switching power supply device according to Embodiment 4.

FIG. 11 is a circuit diagram exemplarily illustrating a configuration of a switching power supply device of Embodiment 4. FIG. 11 is different from FIG. 9 illustrating the switching power supply device of Embodiment 3 only in that overvoltage detection circuit 410 of semiconductor device 400 is connected to the DRAIN terminal. FIG. 12 is a circuit diagram exemplarily illustrating a configuration of overvoltage detection circuit 410 of Embodiment 4. FIG. 12 is different from FIG. 2 illustrating overvoltage detection circuit 110 of Embodiment 3 in that a DRAIN terminal voltage is input in place of the LS terminal voltage, and that resistors 411 and 412 for detecting an input voltage and reference voltage source 414 are connected to comparator 413 with hysteresis. When the DRAIN terminal voltage becomes higher than first threshold voltage Vth_OV set by reference voltage source 414 and resistors 411 and 412, overvoltage detection circuit 410 inverts input overvoltage detection signal VIN_OV which is the output of comparator 413 with hysteresis at the high level to activate input overvoltage detection signal VIN_OV. Overvoltage detection circuit 410 outputs input overvoltage detection signal VIN_OV thus activated to switching control circuit 140 and N-type MOSFET 191 of the discharge circuit. After that, when the DRAIN terminal voltage drops and the DRAIN terminal voltage becomes lower than second threshold voltage Vth_OV2 which is lower that first threshold voltage Vth_OV1 by the hysteresis of comparator 413 with hysteresis, overvoltage detection circuit 410 inverts input overvoltage detection signal VIN_OV at the low level to inactivate input overvoltage detection signal VIN_OV. The hysteresis is set in consideration of a voltage containing a transient spike voltage arising on primary winding 4a of transformer 4.

Operation of the switching power supply device and the semiconductor device according to Embodiment 4 configured as above is described mainly on operation of input overvoltage detection different from that in Embodiment 3.

First, normal behavior of the DRAIN terminal voltage is described. During a period when switching element 309 is performing switching operation, the maximum value of the DRAIN terminal voltage appears immediately after switching element 309 is turned off. That maximum value is expressed as the sum of a voltage containing a transient spike voltage arising on primary winding 4a of transformer 4 and input DC voltage VINDC. During a period when switching element 309 stops switching operation, the DRAIN terminal voltage is input DC voltage VINDC since a voltage does not arise on primary winding 4a of transformer 4. Therefore, even when the input DC voltage VINDC is the same, the DRAIN terminal voltage in the case where switching element 309 is performing switching operation is higher than the DRAIN terminal voltage in the case where switching element 309 stops switching operation.

Next, operation of the switching power supply according to Embodiment 4 in the case where an input overvoltage is applied from AC power supply 1 is described with reference to the timing chart shown in FIG. 13. The time range, in FIG. 13, which is the abscissa is expanded more than the time range shown in FIG. 5 for easy understanding by those skilled in the art on the waveforms of the drain terminal voltage.

When an input overvoltage is applied from AC power supply 1, input DC voltage VINDC rises. The DRAIN terminal voltage accordingly rises, too. The DRAIN terminal voltage input to overvoltage detection circuit 410 is reduced through resistance division by resistors 411 and 412, and the reduced DRAIN terminal voltage is input to comparator 413 with hysteresis. When the DRAIN terminal voltage becomes higher than first threshold voltage Vth_OV1 set by reference voltage source 414 and resistors 411 and 412, input overvoltage detection signal VIN_OV is inverted at the high level to be activated. Thereby, switching element 309 stops switching operation, N-type MOSFET 191 of discharge circuit 190 simultaneously becomes conductible, and the stored charge of smoothing capacitor 3 starts to be forcibly discharged. When the switching operation is stopped due to input overvoltage detection, the DRAIN terminal voltage becomes equal to input DC voltage VINDC. After that, when the input overvoltage applied from AC power supply 1 is recovered to be normal, input DC voltage VINDC drops. When input DC voltage VINDC becomes lower than second threshold voltage Vth_OV2, input overvoltage detection signal VIN_OV is inverted at the low level to be inactivated.

As above, the switching power supply device according to Embodiment 4 performs both input voltage detection and forced discharge only with the existing DRAIN terminal. Thereby, both a terminal dedicated for input detection and a terminal dedicated for discharge can be eliminated, and the switching power supply device can be rationalized.

Discharge may be using switching element 309 and resistor 13. In this case, discharge circuit 190 can be eliminated.

While a configuration of a flyback switching power supply device has been described above, a topologically different configuration may be applicable, such as a step-down chopper one.

Embodiment 5

Next, a switching power supply device and a semiconductor device according to Embodiment 5 are described with reference to FIG. 14 to FIG. 17.

In Embodiment 3, smoothing capacitor 3 starts to be discharged simultaneously to detection of input overvoltage. For Embodiment 5, a switching power supply device which starts discharge after detecting release of AC input overvoltage is described. Duplicate description the same or similar to that for Embodiment 3 is omitted.

Figure 14:
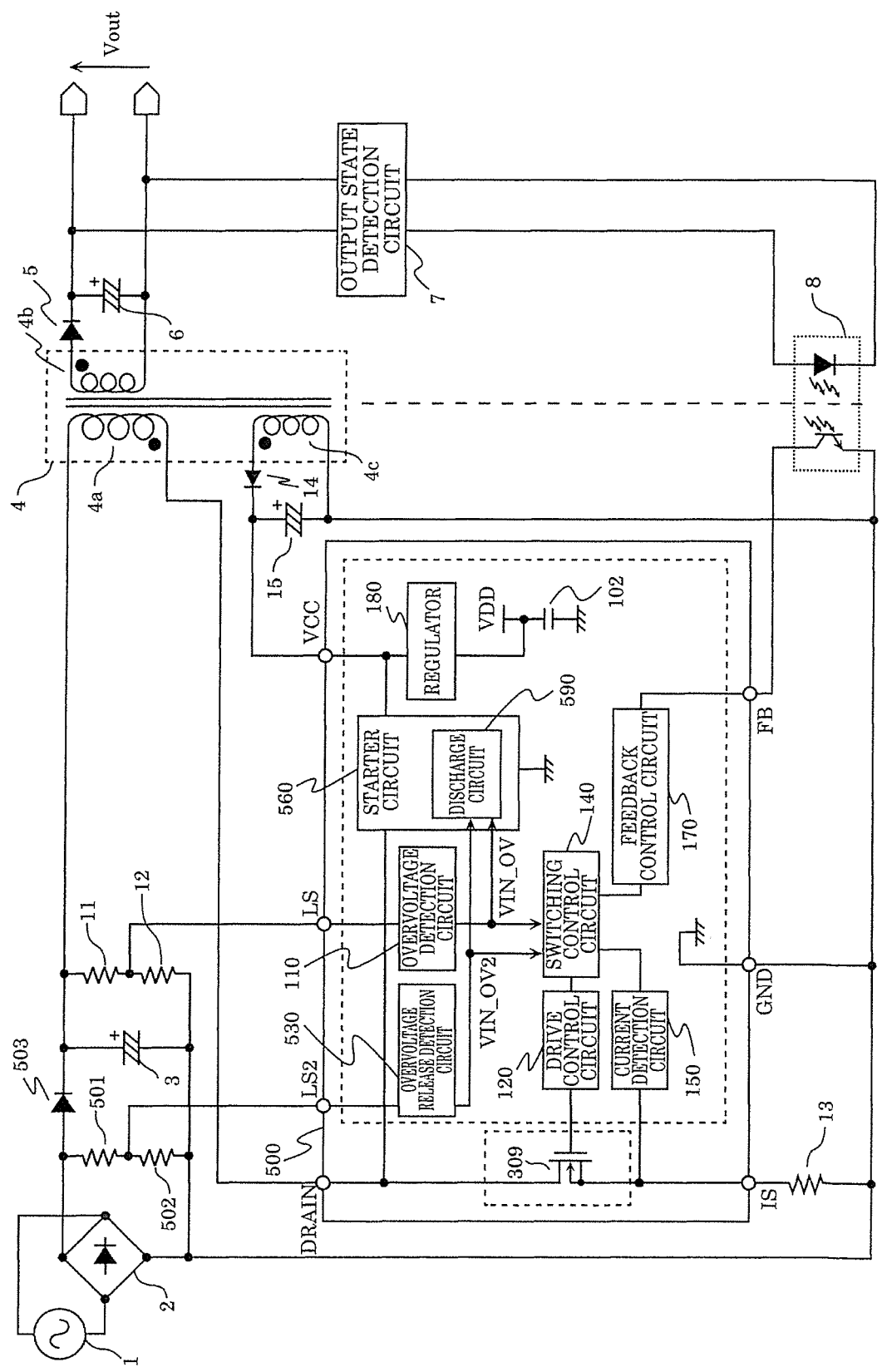
FIG. 14 is a circuit diagram illustrating a configuration of a switching power supply device according to Embodiment 5.

FIG. 14 is a circuit diagram exemplarily illustrating a switching power supply device of Embodiment 5. FIG. 14 is different from FIG. 9 illustrating the switching power supply device of Embodiment 3 in that resistors 501 and 502, rectifier diode 503, overvoltage release detection circuit 530, and an LS2 terminal are added, and discharge circuit 590 is different. Resistor 501 is connected to the output part of bridge diodes 2. To resistors 501 and 502, a pulsating voltage obtained through full-wave rectification of the AC voltage of AC power supply 1 by bridge diodes 2 is applied. The pulsating voltage reduced by resistors 501 and 502 is input to the LS2 terminal of semiconductor device 500. To resistors 11 and 12, input DC voltage VINDC smoothed by smoothing capacitor 3 is applied. The DC voltage reduced by resistors 11 and 12 is input to the LS terminal of semiconductor device 500.

Figure 15:
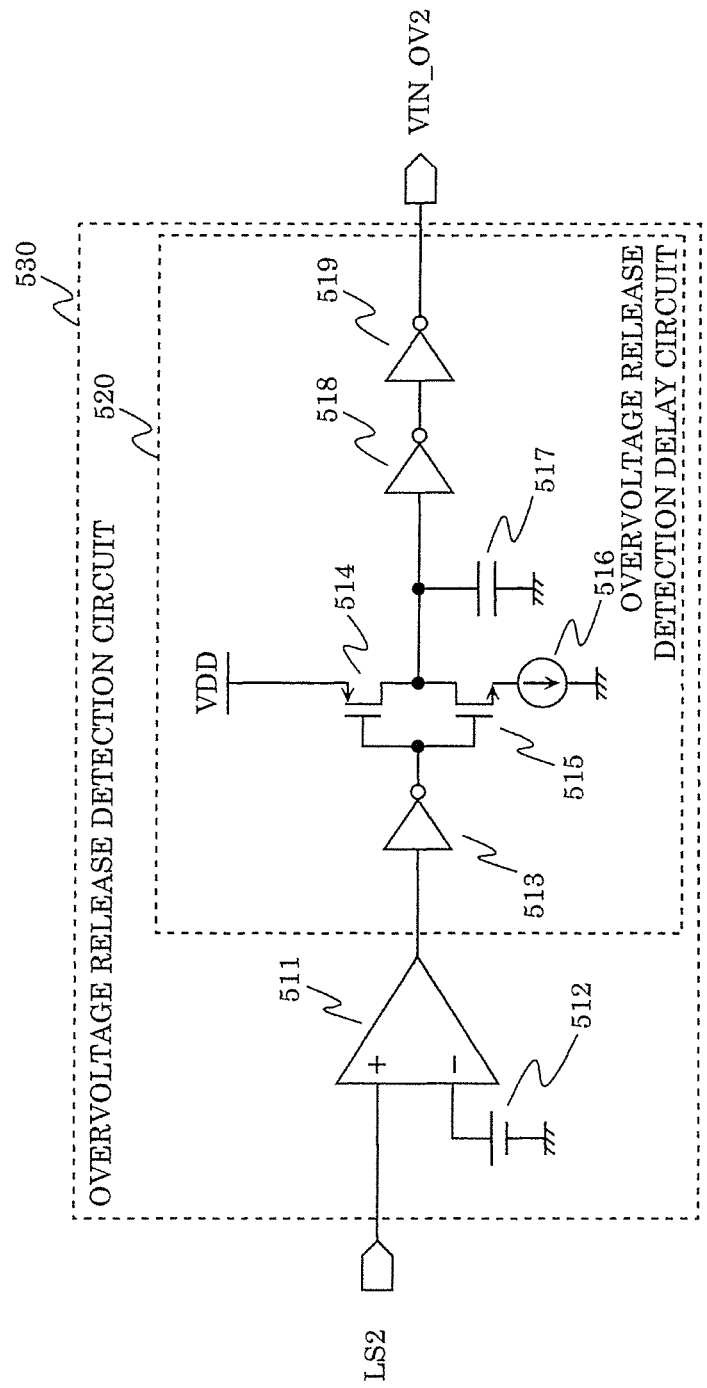
FIG. 15 is a circuit diagram illustrating a configuration of an overvoltage release detection circuit according to Embodiment 5.
Figure 16:
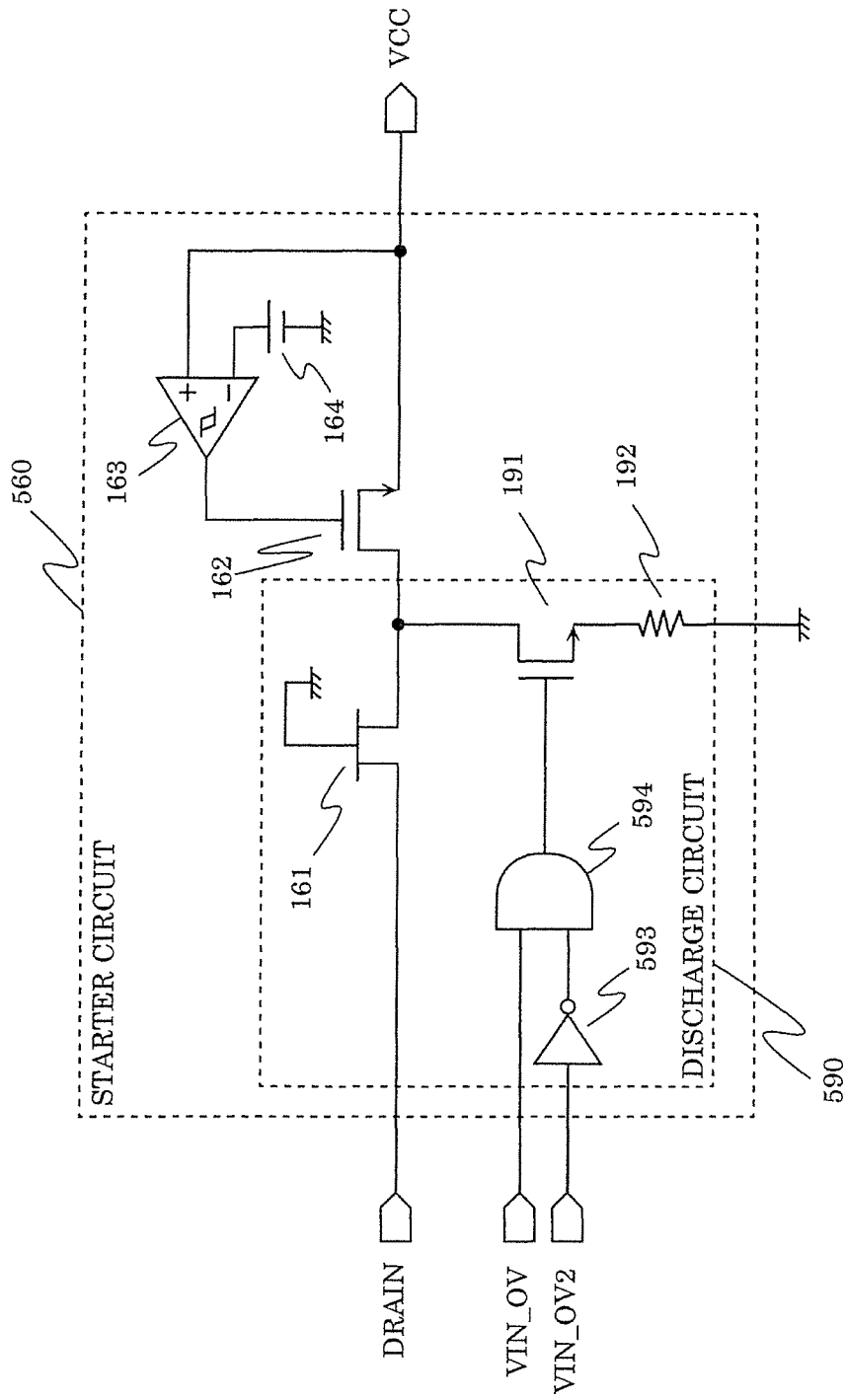
FIG. 16 is a circuit diagram illustrating a configuration of a starter circuit and a discharge circuit according to Embodiment 5.

FIG. 15 is a circuit diagram exemplarily illustrating a configuration of overvoltage release detection circuit 530 of Embodiment 5. Overvoltage release detection circuit 530 includes comparator 511, reference voltage source 512, and overvoltage release detection delay circuit 520. Overvoltage release detection delay circuit 520 includes inverters 513, 518, and 519, constant current source 516, P-type MOSFET 514, N-type MOSFET 515, and capacitor 517. FIG. 16 is a circuit diagram exemplarily illustrating a configuration of discharge circuit 590 of Embodiment 5. As compared with FIG. 4 illustrating discharge circuit 190 of Embodiment 1, inverter 593 and AND circuit 594 are added, and input overvoltage detection signals VIN_OV and VIN_OV2 are input. These components are connected as shown in FIG. 16. With this configuration, when only input overvoltage detection signal VIN_OV is at the high level, N-type MOSFET 191 becomes conductible.

Operation of the switching power supply device and the semiconductor device according to Embodiment 5 configured as above is described mainly on timing of starting discharge different from that in Embodiment 3.

In order to detect the peak value of AC power supply voltage VINAC of AC power supply 1, a pulsating voltage obtained through full-wave rectification is input to the LS2 terminal of semiconductor device 500. During a period when the pulsating voltage is higher than threshold voltage Vth_OV2 set by reference voltage source 512 and resistors 501 and 502, input overvoltage detection signal VIN_OV2 is activated, and input overvoltage detection signal VIN_OV2 thus activated is output from overvoltage release detection circuit 530 to switching control circuit 140 and discharge circuit 590. Meanwhile, the pulsating voltage obtained through full-wave rectification is being input to the LS2 terminal. VIN_OV2 is desirably maintained to be activated since input AC power supply voltage VINAC is still being overvoltaged during the period when the peak value of the pulsating voltage is higher than VIN_OV2. Therefore, in order to determine the state of the overvoltage of AC power supply voltage VINAC, overvoltage release detection delay time Td(LS) is used. The output signal of comparator 511 results in being inactivated within a half-cycle of AC power supply 1 (for example, 10 ms for a 50-hertz AC power supply) even in the state of input overvoltage. When overvoltage release detection delay time Td(LS) set by the constant current of constant current source 516 and capacitor 517 is herein set to be not less than a half-cycle of AC power supply 1, input overvoltage detection signal VIN_OV2 is maintained to be activated.

Meanwhile, when AC power supply voltage VINAC has recovered from the state of input overvoltage to drop, the period when the output signal of comparator 511 is being at the high level becomes longer than overvoltage release detection delay time Td(LS). Then, input overvoltage detection signal VIN_OV2 is inverted at the low level to be inactivated, and thereby, it can be determined that the state of the overvoltage of AC power supply voltage VINAC is released. Input overvoltage detection signal VIN_OV2 thus inactivated is output from overvoltage release detection circuit 530 to discharge circuit 590. As above, by providing overvoltage release detection delay circuit 520, it can be detected, without misdetection, that AC power supply voltage VINAC of AC power supply 1 is recovered to be a normal voltage and the state of overvoltage is released. Thus, the detection result can be output to discharge circuit 590.

Overvoltage detection circuit 110 detects input DC voltage VINDC via resistors 11 and 12 and the LS terminal. During a period when input DC voltage VINDC is higher than threshold voltage Vth_OV, input overvoltage detection signal VIN_OV is activated, and input overvoltage detection signal VIN_OV thus activated is output to switching control circuit 140 and discharge circuit 590. When input DC voltage VINDC drops and input DC voltage VINDC becomes lower than threshold voltage Vth_OV, input overvoltage detection signal VIN_OV is inactivated, and input overvoltage detection signal VIN_OV thus inactivated is output to switching control circuit 140 and discharge circuit 590.

Figure 17:
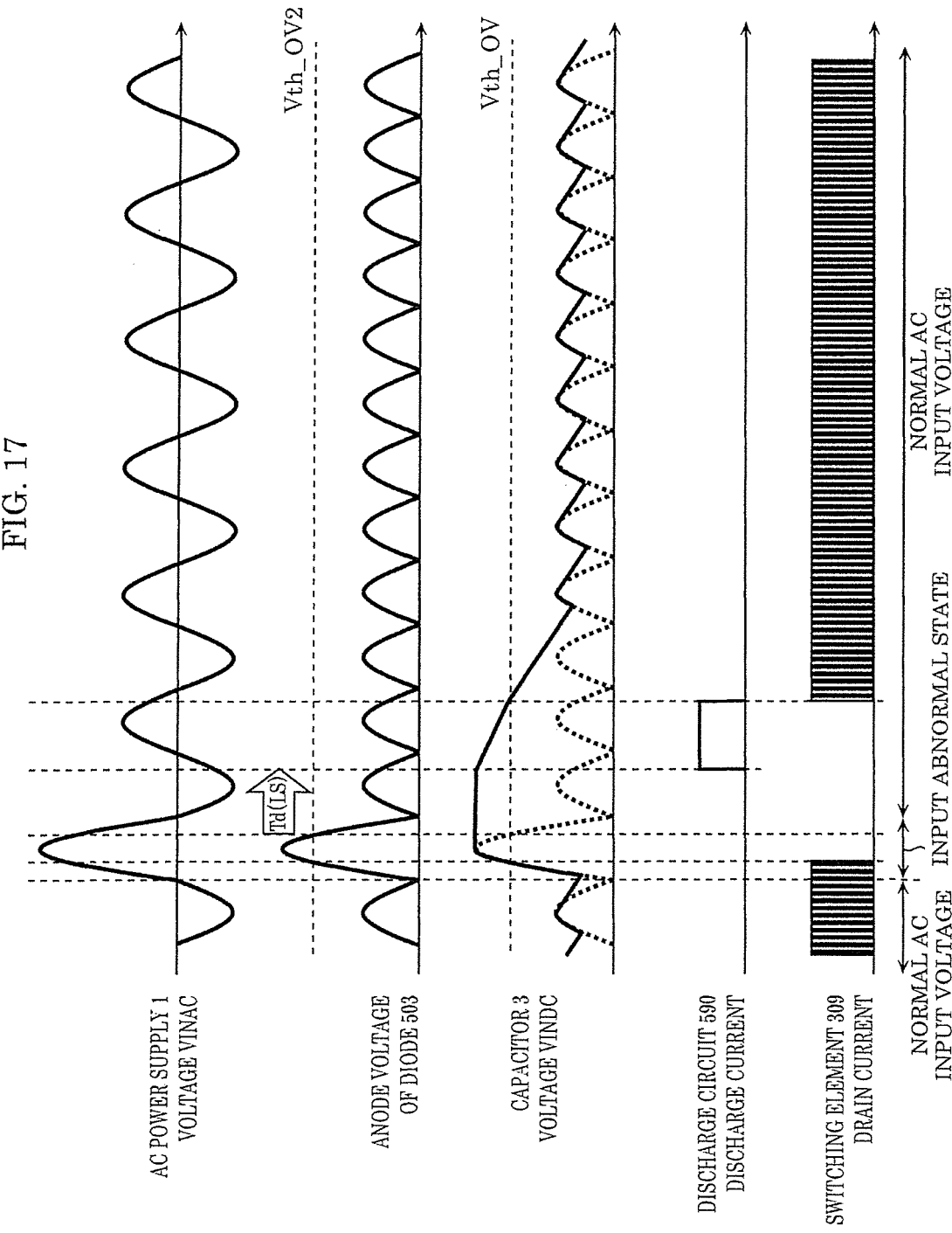
FIG. 17 is a timing chart illustrating a case where an input overvoltage protection function operates in the switching power supply device according to Embodiment 5.

Next, operation of the switching power supply according to Embodiment 5 in the case where an input overvoltage is input from AC power supply 1 will be described with reference to a timing chart shown in FIG. 17.

When an input overvoltage is input from AC power supply 1, AC power supply voltage VINAC and input DC voltage VINDC which is the voltage across the terminals of smoothing capacitor 3 simultaneously rise. Thus, both the LS terminal voltage and the LS2 terminal voltage also rise and are input to overvoltage detection circuit 110 and overvoltage release detection circuit 530, respectively. When the LS terminal voltage becomes higher than threshold voltage Vth_OV, overvoltage detection circuit 110 inverts input overvoltage detection signal VIN_OV at the high level to activate input overvoltage detection signal VIN_OV. Overvoltage detection circuit 110 outputs input overvoltage detection signal VIN_OV thus activated to switching control circuit 140 and AND circuit 594 of discharge circuit 590. When the LS2 terminal voltage becomes higher than threshold voltage Vth_OV2, overvoltage release detection circuit 530 inverts input overvoltage detection signal VIN_OV2 at the high level to activate input overvoltage detection signal VIN_OV2. Overvoltage release detection circuit 530 outputs input overvoltage detection signal VIN_OV2 thus activated to switching control circuit 140 and AND circuit 594. During a period when any of input overvoltage detection signals VIN_OV and VIN_OV2 is input, switching control circuit 140 outputs a low level signal to drive control circuit 120 so as to stop switching operation of switching element 309. Drive control circuit 120 resultantly stops switching operation of switching element 309, and thereby, input overvoltage protection operates.

After that, when the input overvoltage applied from AC power supply 1 is recovered to be normal, the LS2 terminal voltage immediately drops. Overvoltage release detection circuit 530 then inverts input overvoltage detection signal VIN_OV2 at the low level to inactivate input overvoltage detection signal VIN_OV2. Thereby, it is detected that the state of the overvoltage of AC power supply voltage VINAC is released. Discharge circuit 590 makes N-type MOSFET 191 conductible since only input overvoltage detection signal VIN_OV is activated at the high level. Discharge circuit 590 thus starts to forcibly discharge smoothing capacitor 3. This discharge reduces the LS terminal voltage, and when the LS terminal voltage becomes lower than threshold voltage Vth_OV, overvoltage detection circuit 110 inverts input overvoltage detection signal VIN_OV at the low level to inactivate input overvoltage detection signal VIN_OV. Therefore, in discharge circuit 590, N-type MOSFET 191 becomes non-conductible, and discharge circuit 590 stops forcibly discharging smoothing capacitor 3. Moreover, when switching control circuit 140 detects that both overvoltage detection signals VIN_OV and VIN_OV2 are inactivated, switching control circuit 140 outputs a signal based on feedback control circuit 170 and current detection circuit 150 to drive control circuit 120 to resume the switching operation.

As above, with the switching power supply device according to Embodiment 5, forced discharge can be performed only during a period when AC power supply voltage VINAC is recovered to be normal and when the voltage across the terminals of smoothing capacitor 3 is in the state of overvoltage. Hence, unnecessary current consumption and heat generation due to discharge during a period when AC power supply voltage VINAC is in the state of overvoltage can be suppressed.

In order to detect the peak value, a peak holding scheme may be employed to directly detect the peak value.

A configuration using JFET 161 via the DRAIN terminal in discharging has been described above. Discharge may be performed using switching element 309 and resistor 13 via the DRAIN terminal. Discharge may be performed from the LS terminal. Discharge may be performed with the LS terminal connected between primary winding 4a of transformer 4 and the DRAIN terminal.

A configuration in which the LS terminal is connected to the positive electrode side of smoothing capacitor 3 via resistors 11 and 12 has been described above. The LS terminal may be connected between primary winding 4a of transformer 4 and the DRAIN terminal to detect a voltage.

A configuration in which switching element 309 is formed on a different semiconductor substrate from that of semiconductor device 500 has been described above. These may be configured on a single semiconductor substrate. Otherwise, switching element 309 and semiconductor device 500 may be configured into different packages as separate elements.

While a configuration of a flyback switching power supply device has been described above, a topologically different configuration may be applicable, such as a step-down chopper one.

While a switching power supply device according to at least one aspect has been described above based on embodiments, the present disclosure is not limited to these embodiments. There may be contained, within a range of the at least one aspect, modes obtained by applying various variations contrived by those skilled in the art to the present embodiment and modes configured by combining components in different embodiments without departing from the spirit and scope of the present disclosure.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

A switching power supply device and a semiconductor device of the present disclosure each has an input overvoltage protection function for protecting the switching power supply device and/or an electronic device in abnormality of input voltage, and enables switching operation to be quickly resumed after the state of input voltage is recovered from the state of overvoltage to the normal state.

A switching power supply device and a semiconductor device of the present disclosure can be used for switching power supply devices such as AC-DC converters and DC-DC converters built in various electronic devices, and external AC adaptors.

What is claimed is:

1. A switching power supply device, comprising:
a first rectifier circuit to which an AC input voltage is input;
an input smoothing circuit that smoothes a DC input voltage output from the first rectifier circuit;
a power converter circuit that converts the DC input voltage and outputs an output voltage;
an input overvoltage detection circuit that generates an input overvoltage detection signal which is activated when the DC input voltage is higher than a first reference voltage level; and
a discharge circuit that discharges stored charge stored in the input smoothing circuit, wherein
the power converter circuit includes
an energy conversion circuit to which the DC input voltage is input, a switching element that is connected to the energy conversion circuit and converts the DC input voltage by performing a switching operation to output the output voltage, and a switching control circuit that controls switching of the switching element, the switching of the switching element is stopped and discharging of the stored charge is started, with activation of the input overvoltage detection signal serving as a trigger, and when the input overvoltage detection signal is subsequently inactivated, the discharge is stopped and the switching of the switching element is resumed.

2. The switching power supply device according to claim 1, further comprising:

a second rectifier circuit between the first rectifier circuit and the input smoothing circuit; and an input overvoltage release detection circuit to which a pulsating voltage at a connection point between the first rectifier circuit and the second rectifier circuit is input and that generates an input overvoltage release determination signal which is activated when a peak value of the pulsating voltage is lower than a second reference voltage level, wherein when the input overvoltage detection signal is activated and the input overvoltage release determination signal is activated, the discharge of the stored charge is started.

3. The switching power supply device according to claim 1, wherein the switching element, the switching control circuit, the input overvoltage detection circuit, and the discharge circuit are configured as a semiconductor device, the discharge circuit includes the switching element, and the stored charge is discharged via the switching element.

4. The switching power supply device according to claim 1, wherein the switching element, the switching control circuit, the input overvoltage detection circuit, and the discharge circuit are configured as a semiconductor device, the discharge circuit includes a field-effect transistor, and the stored charge is discharged via the field-effect transistor operating in a saturated region.

5. The switching power supply device according to claim 4, wherein the semiconductor device includes a drain terminal connected to the switching element, and the field-effect transistor is connected to the drain terminal.

6. The switching power supply device according to claim 4, wherein the semiconductor device includes a drain terminal connected to the switching element, and the input overvoltage detection circuit is connected to the drain terminal.

7. The switching power supply device according to claim 4, wherein the semiconductor device includes an input detection terminal that detects the DC input voltage, and the input overvoltage detection circuit is connected to the input detection terminal.

8. The switching power supply device according to claim 4, wherein the semiconductor device includes an auxiliary power supply terminal that supplies electric power to the switching control circuit, an auxiliary power supply capacitor is connected to the auxiliary power supply terminal, and the discharge of the stored charge is performed by moving charge to the auxiliary power supply capacitor.

9. The switching power supply device according to claim 4, wherein the semiconductor device includes a starter circuit that supplies the DC input voltage as electric power to the semiconductor device via the field-effect transistor at startup when input of the AC input voltage is started.

10. A semiconductor device for switching control, the semiconductor device being included in the switching power supply device according to claim 4, the semiconductor device comprising:

at least the switching control circuit and a part of the discharge circuit that are configured as an integrated circuit on a semiconductor substrate.

11. The switching power supply device according to claim 1, wherein the switching control circuit, the input overvoltage detection circuit, and a part of the discharge circuit are configured as a semiconductor device, the discharge circuit includes the switching element, and the stored charge is discharged via the switching element.

12. The switching power supply device according to claim 1, wherein the switching control circuit, the input overvoltage detection circuit, and the discharge circuit are configured as a semiconductor device, the discharge circuit includes a field-effect transistor, and the stored charge is discharged via the field-effect transistor operating in a saturated region.

13. The switching power supply device according to claim 12, wherein the semiconductor device includes a high voltage input terminal that supplies electric power to the switching control circuit, and the input overvoltage detection circuit is connected to the high voltage input terminal.

14. The switching power supply device according to claim 12, wherein the semiconductor device includes an input detection terminal that detects the DC input voltage, and the input overvoltage detection circuit is connected to the input detection terminal.

15. A semiconductor device for switching control, the semiconductor device being included in the switching power supply device according to claim 12, the semiconductor device comprising:

at least the switching control circuit and a part of the discharge circuit that are configured as an integrated circuit on a semiconductor substrate.

* * * * *